United States Patent
Coffman

(10) Patent No.: US 7,624,448 B2
(45) Date of Patent: *Nov. 24, 2009

(54) INTELLIGENT INTRUSION DETECTION SYSTEM UTILIZING ENHANCED GRAPH-MATCHING OF NETWORK ACTIVITY WITH CONTEXT DATA

(75) Inventor: Thayne Richard Coffman, Austin, TX (US)

(73) Assignee: 21st Century Technologies, Inc., Austin, TX (US)

( * ) Notice: Subject to any disclaimer, the term of this patent is extended or adjusted under 35 U.S.C. 154(b) by 661 days.

This patent is subject to a terminal disclaimer.

(21) Appl. No.: 11/367,943

(22) Filed: Mar. 4, 2006

(65) Prior Publication Data

US 2007/0209074 A1    Sep. 6, 2007

(51) Int. Cl.
*G06F 11/00* (2006.01)
(52) U.S. Cl. .......................................... 726/23; 726/22
(58) Field of Classification Search ....................... None
See application file for complete search history.

(56) References Cited

U.S. PATENT DOCUMENTS

| | | | |
|---|---|---|---|
| 6,910,135 B1 | 6/2005 | Grainger | |
| 7,058,796 B2* | 6/2006 | Lynn et al. | 713/1 |
| 7,068,998 B2* | 6/2006 | Zavidniak | 455/410 |
| 7,322,044 B2* | 1/2008 | Hrastar | 726/22 |
| 2003/0097588 A1 | 5/2003 | Fischman et al. | |
| 2004/0036716 A1 | 2/2004 | Jordahl | |
| 2004/0250169 A1 | 12/2004 | Takemori et al. | |
| 2006/0112146 A1* | 5/2006 | Song et al. | 707/200 |

FOREIGN PATENT DOCUMENTS

EP    1335557    2/2002

OTHER PUBLICATIONS

International Search Report, PCT/US07/63313, Apr. 18, 2008, ISA/US, PCT.

\* cited by examiner

*Primary Examiner*—Pramila Parthasarathy
(74) *Attorney, Agent, or Firm*—Dillon & Yudell LLP

(57) ABSTRACT

A method, system, and computer program product for utilizing a mapping of activity occurring at and between devices on a computer network to detect and prevent network intrusions. An enhanced graph matching intrusion detection system (eGMIDS) is provided that provides data collection functions, data fusion techniques, graph matching algorithms, and secondary and other search mechanisms. Threats are modeled as a set of entities and interrelations between the entities and sample threat patterns are stored within a database. The eGMIDS utility initiates a graph matching algorithm by which the threat patterns are compared within the generated activity graph via subgraph isomorphism. A multi-layered approach including a targeted secondary layer search following a match during a primary layer search is provided. Searches are tempered by attributes and constraints and the eGMIDS reduces the number of threat patterns searched by utilizing ontological generalization.

26 Claims, 16 Drawing Sheets

| Fig. 3B(1) |
| Fig. 3B(2) |

Fig. 3B(1)

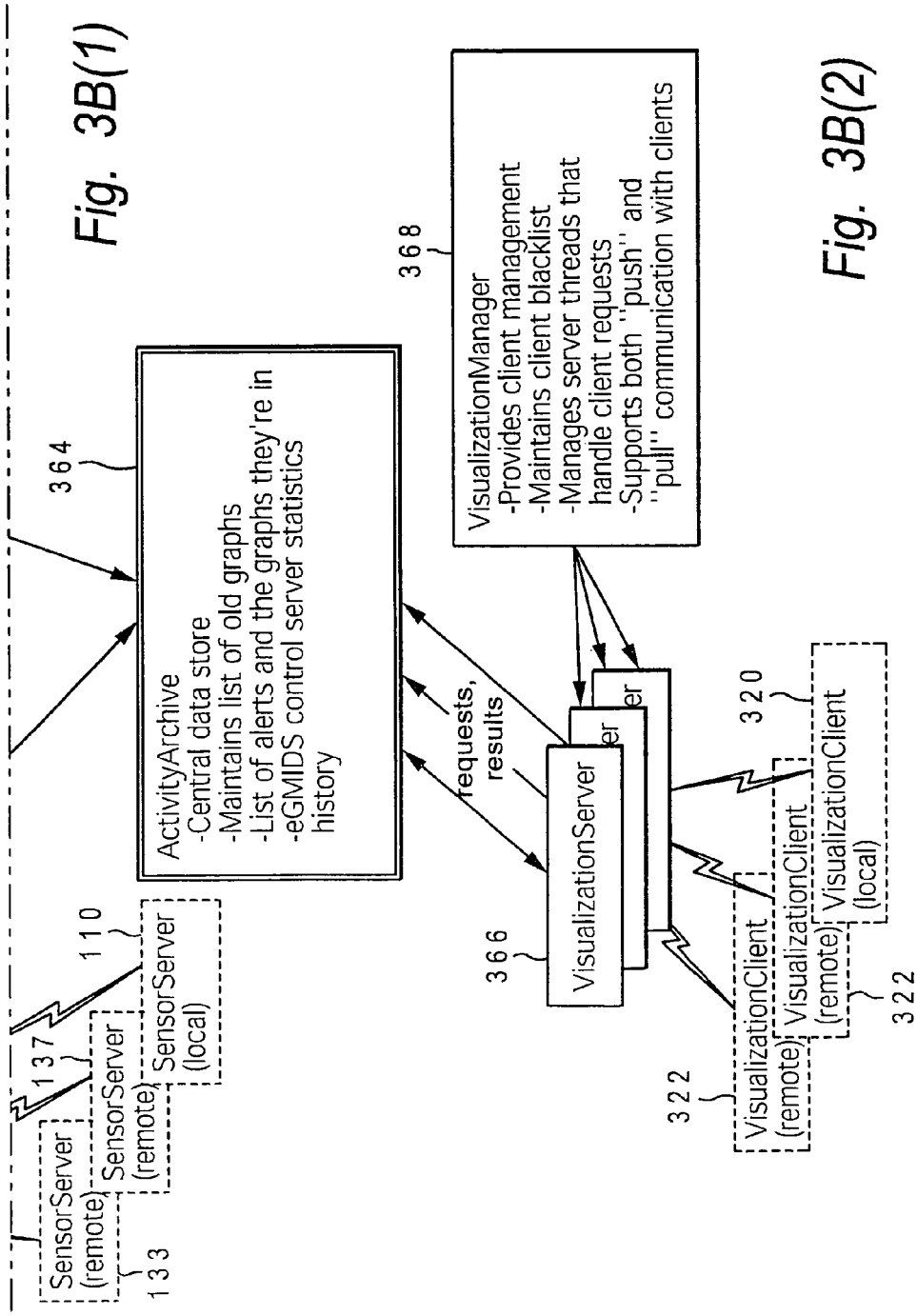
Fig. 3B(1)
Fig. 3B(2)

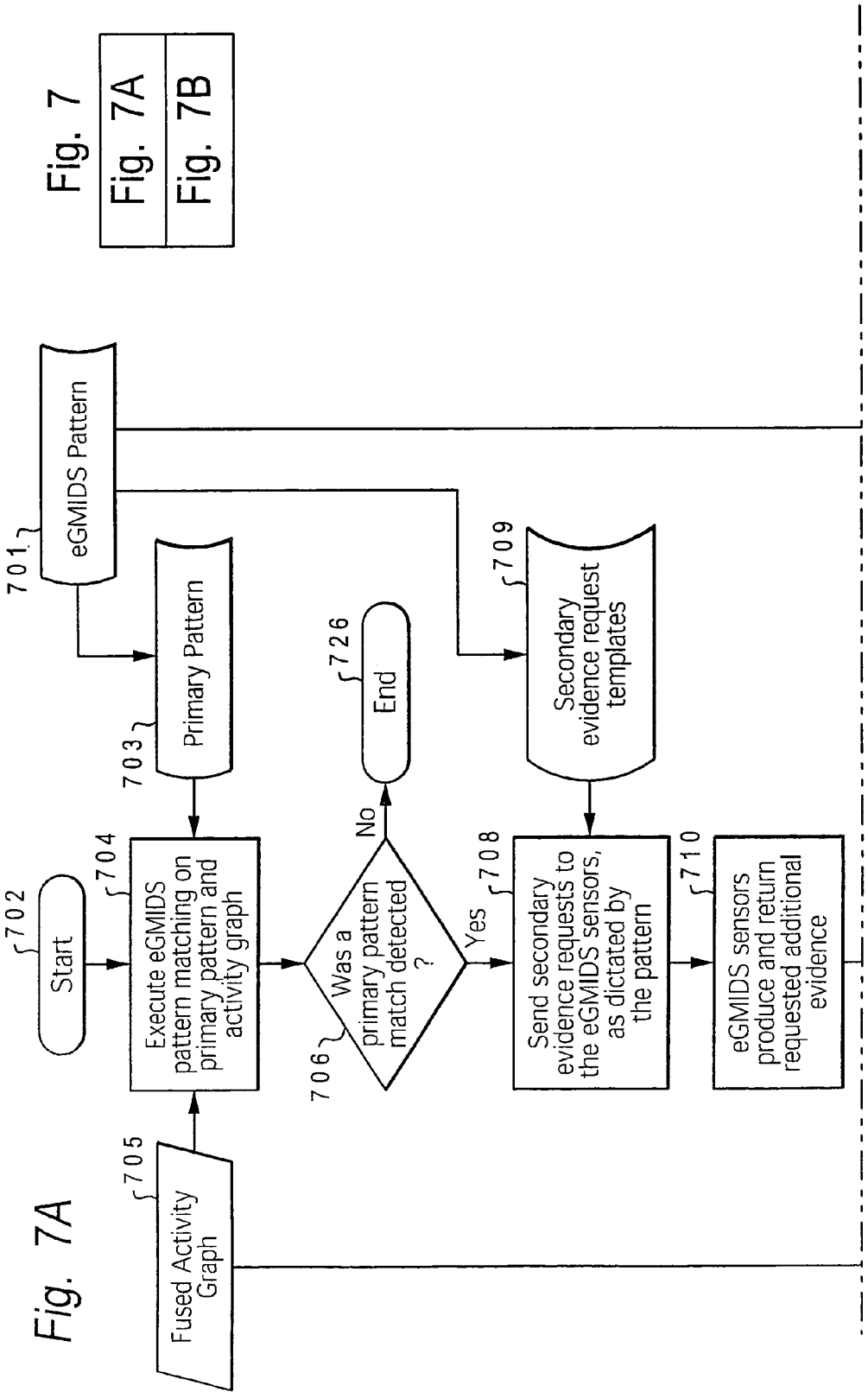

INTELLIGENT INTRUSION DETECTION SYSTEM UTILIZING ENHANCED GRAPH-MATCHING OF NETWORK ACTIVITY WITH CONTEXT DATA

GOVERNMENT RIGHTS

The invention described herein was supported in part with U.S. Government funding under Department of Defense contracts DAAD17-03-C-0065 and W911QX-04-C-0014, administered by the Army Research Laboratory. The U.S. Government has certain rights to this invention.

RELATED APPLICATIONS

The present invention is related to the subject matter of the following commonly assigned, co-pending patent application Ser. No. 11/367,944 titled: "Enabling Network Intrusion Detection by Representing Network Activity in Graphical Form Utilizing Distributed Data Sensors to Detect and Transmit Activity Data." The content of this related application is incorporated herein by reference.

BACKGROUND OF THE INVENTION

1. Technical Field

The present invention relates generally to computer networks and in particular to security of computer networks. Still more particularly, the present invention relates to methods for detecting intrusion and/or intrusion activity on computer networks.

2. Description of the Related Art

In an age where commercial, governmental and military communications and transactions depend on the reliability and security of computer networks, protecting computer networks from attacks and/or ensuring the security of those networks presents significant challenges for network administrators. The damage potentially caused by such attacks may be detrimental to the organization and is often not easily repaired. Depending on the type of organization, whether private or government, a successful attack on a key network may compromise financial accounts, immigration controls, intelligence flows or a host of other sensitive information maintained on the particular network. Such attacks are often the result of a lack of adequate security on the networks or utilization of out-dated security measures, which the attacker(s) are able to breach.

Traditionally, network security was provided solely by human observation, performed by a network administrator or system/network analyst. With this method of security, the analyst expends a substantial amount of time sifting through very extensive and cumulative records of interactions that are mostly harmless. As computer networks continue to expand both in size (number of devices/nodes) and complexity, the sheer volume of traffic on any sizeable network renders ineffective such conventional systems for network security that depended wholly on human observation.

In response, computer-based mechanisms have evolved for detecting network intrusion. Currently, analysts utilize either event-based or rule-based intrusion detection systems (IDS). Rule-based systems are triggered by specific actions such as unauthorized access to a sensitive file. Event-based (or correlation) systems search for combination of actions that together constitute a possible threat. Both systems are designed to filter out harmless traffic while passing on potential threats for the analyst to examine. As with other conventional IDSes, both systems are static in nature, i.e., they do not adapt to changes in the types of attacks directed at the network.

These conventional IDSes look at events without any reference to context and generally produce a high number of false positives, which may potentially overwhelm the analyst. For example, event-based systems present an alarm whenever an event occurs. After looking at that event in the context of other available information, that alarm is often useless noise or even a calculated distraction to take the analyst's attention off of some other threat. Rule-based systems become unwieldy on attacks that involve multiple attackers (for example, coordinated insider-outsider attacks) because the set of rules that must be maintained to distinguish between threats and non-threats is too large. Further, these rule-based systems usually do not integrate data from multiple sources. Additionally, the provided rules are not dynamically adjusted, and thus must be manually updated to detect other (new) types of threats that are not specifically defined within the rules. That need for manual recoding translates into network vulnerability in the interval before new types of attacks are documented.

Thus, while conventional computer-based IDSes provide valuable assistance to the analyst, they do not completely address the problem inherent with modern security threats, which continually evolve as the intruder(s) become more intelligent and/or change their methods of attack to overcome these static mechanisms.

These conventional network-based intrusion detection systems analyze each event (or packet, or session) in isolation, without considering the context of the events or the communication structure of other activity that is also occurring on the network. That is, current intrusion detection systems either consider security events in isolation or utilize an aggregation approach that involves simply counting the numbers of events in a given category. While these mechanisms typically analyze a single user's activity or activity at a single network device in isolation, the methods utilized to breach the security protocols of the networks continually evolve and often involve multiple users and/or multiple network devices. As a result, these conventional systems are plagued by high false alarm rates and suboptimal true positive rates. They also have a general inability to detect either "insider" attacks or coordinated attacks that require a set of attackers working together.

SUMMARY OF THE INVENTION

Disclosed is a method, system, and computer program product for detecting and mapping activity occurring at and between devices on a computer network and utilizing the mapped activity to detect and prevent network intrusions. Several processes are provided, including detecting, investigating, and analyzing network intrusions, such as malicious attack on or unauthorized use of network resources. An enhanced graph matching intrusion detection system (eGMIDS) is provided via an eGMIDS utility executing on a control server within the network. The eGMIDS utility comprises data collection functions, data fusion techniques, graph matching algorithms, and secondary and other search mechanisms that are accessible via an eGMIDS analysis console. These components are utilized to provide early detection of possible attacks on the network or network device(s).

The eGMIDS comprises multiple sensors that are located at different remote devices of the network and utilized to detect specific types of activity occurring at the respective devices. The sensors may be specialized sensors or off-theshelf sensors that are enhanced to support eGMIDS data format and retrieve specialized data relevant to eGMIDS processing. Specific events/activities at the device are detected by the sensor, and activity data is generated in response to the detected event/activities. The sensors convert the data into a single eGMIIDS format assigned to such data and encapsulate the data in a special transmission packet that is transmitted to the control server. Different types of data at different remote devices may be assigned to a specific eGMIDS format from among several eGMIDS formats utilized. The special transmission packets are packaged for transmission to a central eGMIDS server.

These special transmission packets with the activity data are received during a detection cycle initiated at the eGMIDS control server. The eGMIDS utility converts the activity data within these packets into an eGMIDS-usable format. The eGMIDS utility then processes the converted data via a data fusion technique that generates a graphical representation (i.e., an activity graph) of the network (devices) and the activity occurring at/amongst the various devices on the network.

In one embodiment, threats are modeled in eGMIDS as a set of entities and interrelations between the entities. Sample threat patterns are then generated and stored within an eGMIDS database. After the activity graph is generated, the eGMIDS utility initiates a graphical matching algorithm by which pre-established threat patterns representing known or suspected intrusion methods (threat patterns) are compared within the activity graph. These threat patterns are then searched for as a subgraph isomorphism inside of the activity graph.

In one embodiment, eGMIDS utility completes its pattern matching search function via an algorithm called merging matches, while in other embodiments eGMIDS completes the threat pattern search via a genetic search algorithm. Both algorithms enable efficient searching for threat patterns within the activity graph, but are each better suited to different types/sizes of patterns. With the merging matches algorithm, the search engine of eGMIDS utilizes a constructive search method, building potential matches node by node until a match is identified. Merging matches algorithm starts by separately matching small pieces of the threat pattern. These partial matches are then combined with each other to form larger partial matches. Processing continues until the entire pattern is matched.

With the genetic search algorithm, an initial population is generated by randomly selecting nodes in the pattern graph to create potential matches. These matches are then ranked by a fitness function to determine their closeness to the inputted threat pattern. Following this initial creation, the successive development of this population is provided through processes modeling reproduction and natural selection.

In one embodiment, the graph matching engine of eGMIDS distributes its genetic search functionality over several processes (potentially running on different machines) to increase the speed of the search. Each process then performs its own genetic search on a limited domain and returns its findings to a centralized eGMIDS process. Once all subordinate processes have reported their results, eGMIDS utility forwards/outputs acceptable matches to the analyst.

The eGMIDS is provided with inexact matching capability, which gives eGMIDS the ability to detect new threat variations the first time the variations are seen. In yet another embodiment, a multi-layered approach is utilized to detecting possible threatening activity. The first layer involves the basic subgraph isomorphism. When a match is found by the search conducted at the first layer however, the eGMIDs utility issues a request for secondary layer information associated with the particular devices (nodes) and/or activity. At the remote device, this request causes the corresponding sensor to drill down further for secondary information, which is returned to the eGMIDS control server. This secondary information is then fused into the activity graph and a second search is conducted on the relevant portion of the activity graph to determine if the secondary layer data also matches the particular threat pattern. A match at both layers indicates the existence of a threat or an activity of special interest to be presented to the analyst for review.

According to one embodiment, the graphical representation also stores attributes possessed by each device (node) or relationship (edge). These attributes may then be utilized to improve the accuracy of pattern searches. In addition, eGMIDS provides the facility for a security analyst to define constraints on a threat pattern that filters out matches that may have the same configuration as a potential threat, but are most likely harmless. These constraints utilize node and edge attributes to refine search criteria and improve the detection of real threats while decreasing false alarms. The eGMIDS thus accounts for the relevance of context in threat detection.

In one embodiment, eGMIDS also relies on a searching mechanism called inexact matching to respond to mutations (i.e., changes in strategies and techniques) by potential hackers that may cause threatening activity to escape the notice of rule-based detection systems. By using inexact matching, eGMIDS is able to effectively detect variations on previously recorded strategies, giving the analyst a head start on emerging threats. At each level of the construction, candidate matches are scored according to how well they match a threat pattern being searched for. This score is based on the presence or absence of nodes and edges along with their attributes and constraints.

Within inexact matching, attribute values may be marked as necessary, so incorrect or missing values result in a negative match. Constraints may be marked as necessary, so violated (or indeterminate) constraints result in a negative match. All other attributes and constraints are given points according to their importance to the threat pattern. Whenever a candidate match passes a certain threshold of similarity to the threat pattern (e.g., accrues a minimum threshold number of points), then the candidate match is sent to the analyst for inspection, even though every detail might not match. The analyst may then refine the threat pattern to reflect whether the partial match is irrelevant or a significant security development.

In another embodiment, eGMIDS reduces the number of threat patterns searched by utilizing ontological generalization, by which eGMIDS is able to recognize classes of entities. The ontological approach reduces in size the number of threat patterns for which a search must be performed.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
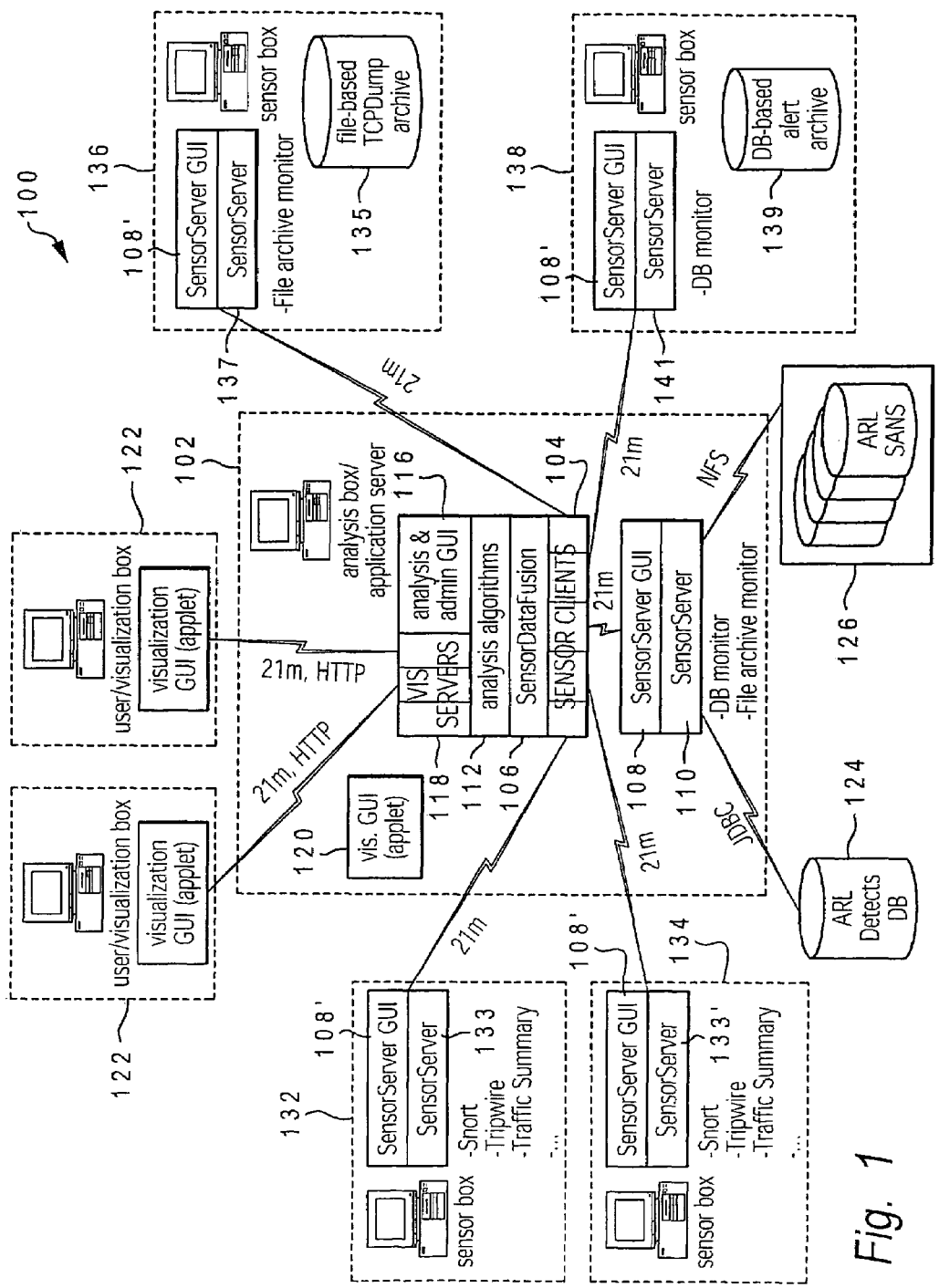
FIG. 1 illustrates an example layout of a network within which the enhanced graph matching intrusion detection system (eGMIDS) of the present invention may advantageously be implemented, according to one embodiment of the invention.

The present invention provides a method, system, and computer program product for detecting and mapping activity occurring at and between devices on a computer network and utilizing the mapped activity to detect and prevent network intrusions. Several processes are provided, including detecting, investigating, and analyzing network intrusions, such as malicious attack on or unauthorized use of network resources. An enhanced graph matching intrusion detection system (eGMIDS) is provided via an eGMIDS utility executing on a control server within the network. The eGMIDS utility comprises data collection functions, data fusion techniques, graph matching algorithms, and secondary and other search mechanisms that are accessible via an eGMIDS analysis console. These components are utilized to provide early detection of possible attacks on the network or network device(s).

The eGMIDS performs signature-based intrusion detection where the structure and relationship (including, but not limited to temporal relationships) between multiple events are key parts of the information utilized to distinguish threatening activity from benign activity. Structural information is represented in eGMIDS via graph-based threat patterns and eGMIDS takes into consideration communication pattern structure.

As utilized herein the following terms are defined as followed:

(1) eGMIDS server: a combination of hardware, virtual emulation of hardware, and software components that collectively provide: (a) network server functionality for receiving and transmitting network communication, particularly "sensor data" and requests for "secondary data"; (b) an eGMIDS analysis console executing on the hardware and which displays a graphical user interface (GUI) that is accessible to a human operator (or security analyst) for activation of eGMIDS functionality and manipulation of threat patterns, etc.; and (c) an eGMIDS utility executing on the server's processor(s) and which provides the support for all eGMIDS background functionality and enables the eGMIDS analysis console;

(2) host: a client or server device on which user or application activity occurs that is tracked by a local sensor;

(3) sensor: any hardware and/or software component that is able to detect user and other activity at a client or server. In one embodiment, the sensor also comprises an adapter for converting sensed data into eGMIDS format for transmission to the eGMIDS server.

Other terms utilized are defined according to their described functionality within the context of the eGMIDS operation.

The description of the invention is presented with multiple sections and subsections, delineated by corresponding headings and subheadings. The headings and subheadings are intended to improve the flow and structure of the description, but not imply any limitations on the invention. The content (i.e., features described) within any one section may be extended into other sections. Further, functional features provided within specific sections may be practiced individually or in combination with other features provided within other sections. That is, the specific implementations of eGMIDS may utilize only some of the functional features among multiple features described in particular sections and/or may include only features described in some (not all) of the sections. For example, eGMIDS may be implemented with or without secondary evidence mechanisms.

More specifically, Sections A and B introduce the concept of eGMIDS and provide a structural layout for the network and control server provided therein. Sections C and D describe the software-implemented components of the eGMIDs server and the utilization of commercially available sensors as well as specialized sensors with special adapters sensors developed to detect different types of activity data. Section D also describes special packaging of the sensed activity data, transmission to a central eGMIDS control server, and fusion into an activity graph. Finally, these sections provide a description of the fusion of the activity data into an activity graph. Sections E, F, and G then describe various methods/mechanisms by which the generated activity graph is utilized to detect possible intrusions based on threat patterns and variations thereof.

Within the descriptions of the figures, similar elements are provided similar names and reference numerals as those of the previous figure(s). Where a later figure utilizes the element in a different context or with different functionality, the element is provided a different leading numeral representative of the figure number (e.g., 1xx for FIG. 1 and 2xx for FIG. 2). The specific numerals assigned to the elements are provided solely to aid in the description and not meant to imply any limitations (structural or functional) on the invention.

A. eGMIDS General Overview

The enhanced Graph Matching Intrusion Detection System (eGMIDS) performs data fusion on information from sensor networks inside and/or outside a secured network to build a graph representation of network topology, user activity, and network state. Utilizing a plurality of sensors dispersed throughout the various nodes of the network, data is collected, converted into an eGMIDS format and mapped into an electronic graph representation (referred to hereinafter as an "activity graph") via a process referred to as data fusion. Once the activity graph is generated, a sequence of searches is dynamically automatically performed (perhaps on a periodic basis) to determine whether there exists any pre-defined threat patterns within the activity graph. The process of conducting the search is generally referred to as intrusion detection, and involves a series of complex matching algorithms that provide intelligent analysis of the previously generated graph of nodes and associated interactivity.

According to the invention, threat patterns are represented as graphs, and subgraph isomorphism (graph matching) capabilities of eGMIDS quickly identify suspicious activity within the sensed network state. The eGMIDS provides new capabilities for merging information to detect distributed and coordinated attacks perpetrated by insiders and/or outsiders. In one embodiment, eGMIDS provides the capability to detect a threat even when the entire threat pattern is not carried out by a single user. With eGMIDS, false alarms are avoided because threats are expressed in a rich representation that describes multiple coordinated actions in context, rather than just simple context-free packet filters.

The eGMIDS provides a dynamic graph matching function, expanded with added functionality that enables utilization as an intelligent intrusion detection systems (IDS). The eGMIDS provides an approach to detecting insider and coordinated insider-outsider threats.

Neither existing commercial intrusion detections systems (IDSs) nor other systems under research provide the set of capabilities offered by eGMIDS. Existing systems suffer problems with false alarm rates, poor detection of insider and coordinated attacks, and data fusion problems. Primarily, other IDSs do not take advantage of structure of the relationships between events and communications for the purposes of threat detection.

The eGMIDS approach provides capabilities beyond current network-based, host-based, and Tripwire-style IDSs. All of these systems suffer from a lack of data fusion. This prevents them from detecting attacks that are made up of combinations of suspicious and seemingly innocuous events. They may detect a piece of the threat, but because they do not perceive the entire situation, the pieces are never put together and the threats go unnoticed. This lack of understanding of the context that individual events occur in also causes a high rate of false alarms. The eGMIDS, on the other hand, uses the topology of its graph representation in order to develop an understanding of context that greatly reduces the incidence of false alarms.

The eGMIDS places new power in the hands of the security analyst to recognize complex threats and to detect novel attacks. Through its support of secondary evidence and layered pattern matching, the eGMIDS also automates much of the initial investigation that analysts currently perform manually, so that the analyst can avoid wasting time investigating false alarms and instead focus on reviewing significant threats and defining new threat patterns. The eGMIDS' ability to harness other IDSes with their own unique strengths centralizes and simplifies the task of intrusion detection. Further, techniques such as inexact matching provide the analyst with information or threat variations that he may not have even known to look for.

With the conventional IDS systems, "event correlation" and other reasoning over inter-event relationships is generally nothing more than counting up events that fall into different categories. Unlike the eGMIDS approach, these conventional approaches ignore the structure of the relationships between events and between communication paths and streams.

The eGMIDS utility performs signature-based intrusion detection where the structure and relationship (including, but not limited to temporal relationships) between multiple events is a key part of the information used to distinguish threatening activity from benign activity. The structural information is represented in GMIDS via graph-based threat patterns. Compared to conventional intrusion detection systems, eGMIDS provides lower false positive rates, higher true positive rates, and improved situational awareness for network defenders.

B. eGMIDS Network Configuration/Layout and Control Server

With reference now to the figures, FIG. 1A depicts a pictorial representation of a network of data processing systems (Network system 100) in which the present invention may be implemented. Network system 100 contains network backbone/infrastructure (not specifically shown), which is the medium utilized to provide communication links between various devices and computers connected together within network system 100. Network backbone may include routers and gateways and other communication/routing mechanisms, and may provide connections via wire, wireless communication links, or fiber optic cables.

In the depicted example, network system 100 comprises eGMIDS control server 102, which comprises several hardware and software components that enable eGMIDS functionality, based on received data/information from remote host devices. As illustrated, eGMIDS control server 102 comprises software-implemented graph generation, graph matching intrusion detection system utility (hereinafter referred to as eGMIDS utility). The eGMIDS utility comprises a plurality of sensor clients 104, sensor data fusion engine 106, analysis algorithms 112, analysis and administrative graphical user interface (GUI) 116, and visualization clients 118. Among the functions provided by eGMIDs control server 102 (utilizing eGMIDS utility) and associated GUIs (116, 120, 122) are the following: (a) receiving activity data and converting into eGMIDS format; (b) complete data fusion to generate activity graph; (c) perform pattern matching; (d) compile alerts, alert logs, alert output to eGMIDS database (DB); (e) service visualization GUI requests; (f) pattern management; (g) algorithm management; (h) graph conversion and graph archives; (i) monitor status of CPU usage, sensors, etc.; and (j) all visualization tasks. It should be noted that this list of functions is not meant to be exhaustive of the functions provided by eGMIDs utility but merely representative of some of the available/provided functions.

Sensor clients 104 receive transmission of sensed data from respective sensor servers (110, 133, 137, 141) via a specialized 21m transmission protocol (described below). Sensor servers (110, 133, 137, 141) have associated sensor server GUIs 108', which enable user management of sensor servers (110, 133, 137, 141). Configuration and administration of the remote sensor servers is done via the sensor server GUI (108, 108'). As shown, sensor server and associated GUI may be either remote (110, 133, 137, 141) or local (110) to control server 102. Many sub-types of sensor servers are possible. Sensor server (110, 133, 137, 141) can provide a variety of functionality depending on the specific sub-type of the sensor server. One type (e.g., sensor server 141) provides the functionality of a database (DB) monitor. Another (e.g., sensor server 137) provides a file archive monitor. Yet another (e.g., sensor server 133) provides integration with third-party sensors like Snort and/or Tripwire. Communication with databases (124, 139) or storage area network system (SANS) 126 can be via Java Database Connectivity (JDBC) or Network File System (NFS), respectively. In the illustrative embodiment, the US Army Research Laboratory (ARL) detects database 124 and ARL SANS 126 are components that are external to eGMIDS control server 102.

Visualization clients 118 integrate multiple user/visualization GUIs 122 (external to eGMIDS control server 102) with server visualization GUI 120 (provided by eGMIDS control server 102). These visualization GUIs 120/122 may be Java applets, in one embodiment. Each external user/visualization GUI 122 is utilized to provide a series of viewable features, including: (a) current activity graph; (b) alerts, alert logs and histories; (c) expanded descriptions of relative network information (also known as "drill downs") via integration with third-party tools; and (e) past activity graphs. All other user interactions with other parts of the eGMIDS are completed via the "analysis and administrative" GUI 116.

Connected to sensor clients 104 of eGMIDS control server 102 are multiple remote hosts (networked devices) 132, 134, 136 and 138. In the illustrative embodiment, each remote host (132 ... 138) is connected to a particular one of sensor clients 104. In other embodiments, remote hosts having similar sensors (as described below) share one of sensor clients 104. Remote hosts 132 ... 138 may include, for example, desktop computers, network terminal computers, portable computers/notebooks, and/or other portable computing devices. Portable computing devices may be a PDA (personal digital assistant), blackberry, smart phone, cell phone or other such devices, which are able to access network system 100 and transmit and/or receive data over network system 100. In one embodiment, eGMIDS control server 102 provides sensor data retrieval utilities (such as boot files, operating system images, and applications) to remote hosts 132 ... 138, when remote hosts (132 ... 138) are initially connected to and set up on network 100. Each remote host 132 ... 138 may support/provide different functionality. These processes (e.g., an agent) may be activated and remain running on the remote sensors following initial system setup, in one implementation. For example, remote host 136 includes a file-based TCPDump archive 135 and thus operates as a file archive monitor. Also, remote host 138 comprises a DB-based alert archive 139 and thus provides a DB monitoring function.

FIG. 1 and the other figures described below are provided as examples within the illustrative embodiment(s), and are not to be construed as providing any architectural, structural or functional limitation on the present invention. The figures and descriptions accompanying them are to be given their broadest reading including any possible equivalents thereof.

Network system 100 may include additional servers, clients, and other devices not shown. The exact complexity of network devices may range from a simple two device network to a network comprising thousands or more interconnected devices. In the described embodiment, network system 100 is an intranet or a local area network (LAN), which may be configured similarly to FIG. 4C. In more complex implementations, network system 100 may be a wide area network (WAN), such as the Internet and the network infrastructure may be represented as a global collection of smaller networks and gateways that utilize the Transmission Control Protocol/Internet Protocol (TCP/IP) suite of protocols to communicate with each other. Of course, for simplicity of description of the functionality associated with features of the invention, network system 100 is assumed to be a private (and perhaps localized) network, such as LAN 150, for example.

Figure 2:
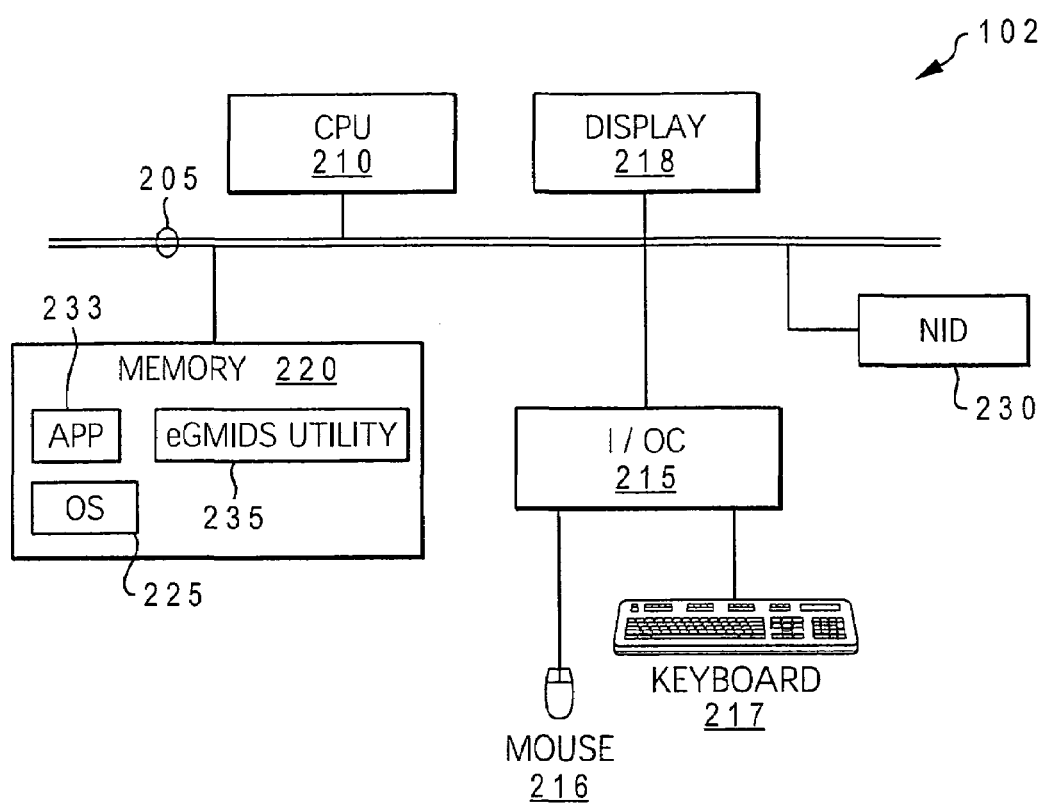
FIG. 2 is a block diagram representation of an example computer system, which may be utilized as either an eGMIDS control server or eGMIDS remote sensor according to one embodiment of the invention.

Referring now to FIG. 2, there is depicted a block diagram representation of a data processing system that may be utilized as eGMIDS control server 102 (or one of eGMIDS remote sensors) in FIG. 1, in accordance with an illustrative embodiment of the present invention. The eGMIDS control server 102 may be a symmetric multiprocessor (SMP) system including one or more central processing units (CPU) 210 connected to memory 220 via system interconnect/bus 205. Also connected to system bus 205 is I/O bus controller 215, which provides connectivity and control for input devices, mouse 216 and keyboard 217, and output device, display 218

The eGMIDS control server 102 further comprises one or more network interface devices (NID) 230 by which eGMIDS control server 102 communicates/links to a network and/or remote hosts 132 ... 138. NID may comprise modem and/or network adapter, for example, depending on the type of connection to the network.

Those of ordinary skill in the art will appreciate that the hardware depicted in FIG. 2 is a basic illustration of a computer device and may vary from system to system. Thus, the depicted example is not meant to imply architectural limitations with respect to the present invention.

C. eGMIDS Functional Software Components and Processes

Notably, in addition to the above described hardware components of eGMIDS control server 102, various features of the invention are provided as software code stored within memory 220 or other storage (not shown) and executed by CPU 210. Located within memory 209 and executed on CPU 210 are a number of software components, including operating system (OS) 225 (e.g., Microsoft Windows®, a trademark of Microsoft Corp, or GNU®/Linux®, registered trademarks of the Free Software Foundation and The Linux Mark Institute) and a plurality of software applications, of which eGMIDS utility 235 is shown. In actual implementation, eGMIDS utility 235 may be added to an existing application server or other network device to provide the enhanced graph matching and intrusion detection features within that device, as described below.

CPU 210 executes these (and other) application programs 233 (e.g., network connectivity programs) as well as OS 262, which supports the application programs 233. Among the software code provided by eGMIDS utility 235 are: (a) code for enabling eGMIDS control server functionality; (b) code for enabling network connection and communication with remote devices on the network via modem and/or network adapter; and more specific to the invention, (c) code for enabling the various activity graph generation, graph matching and intrusion detection features/methods described below, and (d) code for displaying an eGMIDS analysis console and enabling user interaction with and structuring of the eGMIDS functionality. For simplicity, the collective body of code that enables these various features is referred to herein as eGMIDS utility. According to the illustrative embodiment, when CPU 210 executes OS 225 and eGMIDS utility 235, eGMIDS control server 102 initiates a series of functional processes, including: network monitoring, translating received data into eGMIDS format, enhanced graph matching, secondary evidence mapping and other eGMIDS features/functionality described below and illustrated by FIGS. 3-7.

Notably, when the data processing system is utilized as a remote host (other than the control server), the executing utility also includes code for: (e) providing specialized adapter functionality for the specific sensor begin utilized; (f) packaging the sensed data activity of interest into a specialized eGMIDS format; (g) responding to requests for secondary data; and (h) transmitting the packaged data to the eGMIDS control server 102.

Figure 3A:
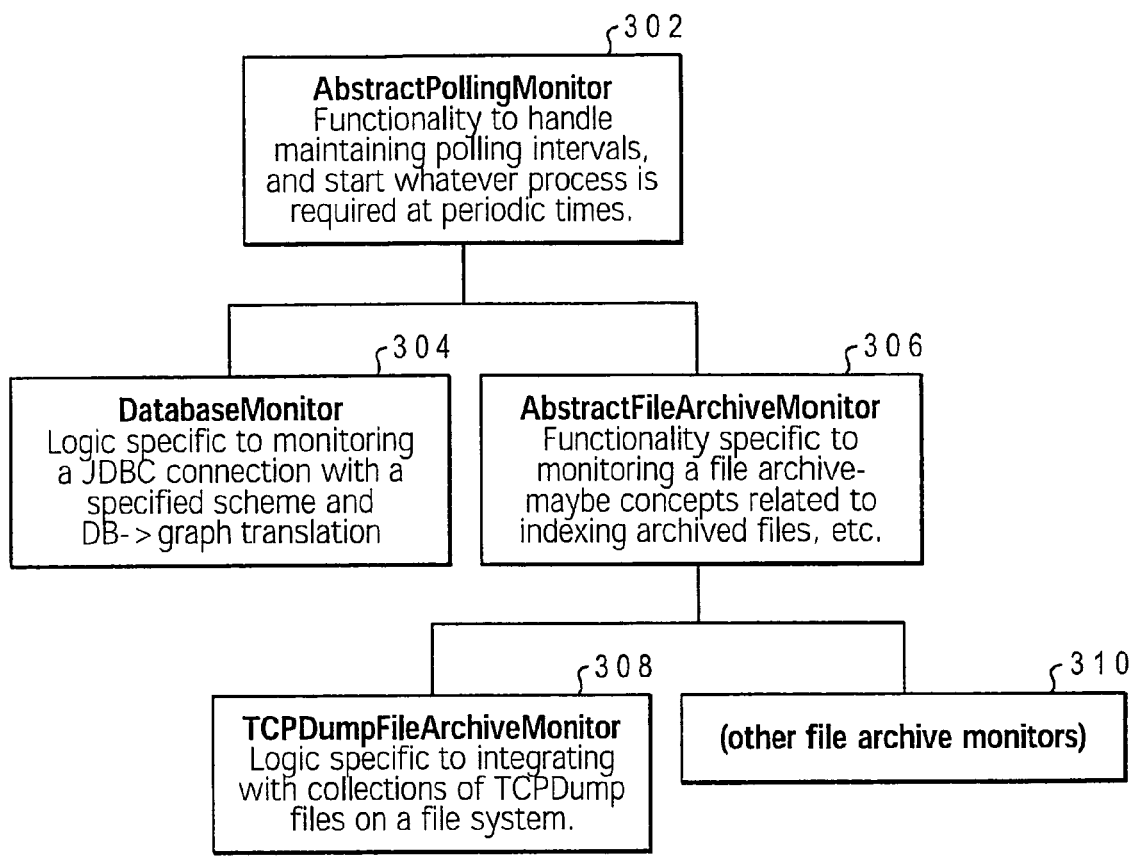
FIG. 3A is a block diagram representation of a hierarchical relationship between specific software-coded monitors of eGMIDS utility according to one embodiment of the invention.

FIG. 3A illustrates a class hierarchy implementation, highlighting the breakdown between shared and unique functionality among several primary monitors provided within eGMIDS utility. These monitors and their respective functions include: (1) abstract polling monitor 302, which includes the functionality to handle maintaining polling intervals and start processes at the required periodic times; (2) database monitor 304, which includes logic specific to monitoring a JDBC (Java database connectivity) connection with a specified schema and a DB-to-graph translation; (3) abstract file archive monitor 306, which provides the functionality specific to monitoring a file archive, including concepts related to indexing archived files; and (4) TCP (transmission control protocol) dump file archive monitor 308, which includes logic specific to integrating with collections of TCP-Dump files in a file system. Other file archive monitors 310 are also provided in other embodiments. As shown, each individual node within the hierarchy has a single direct parent but may have more than one ancestor.

Figure 3B:
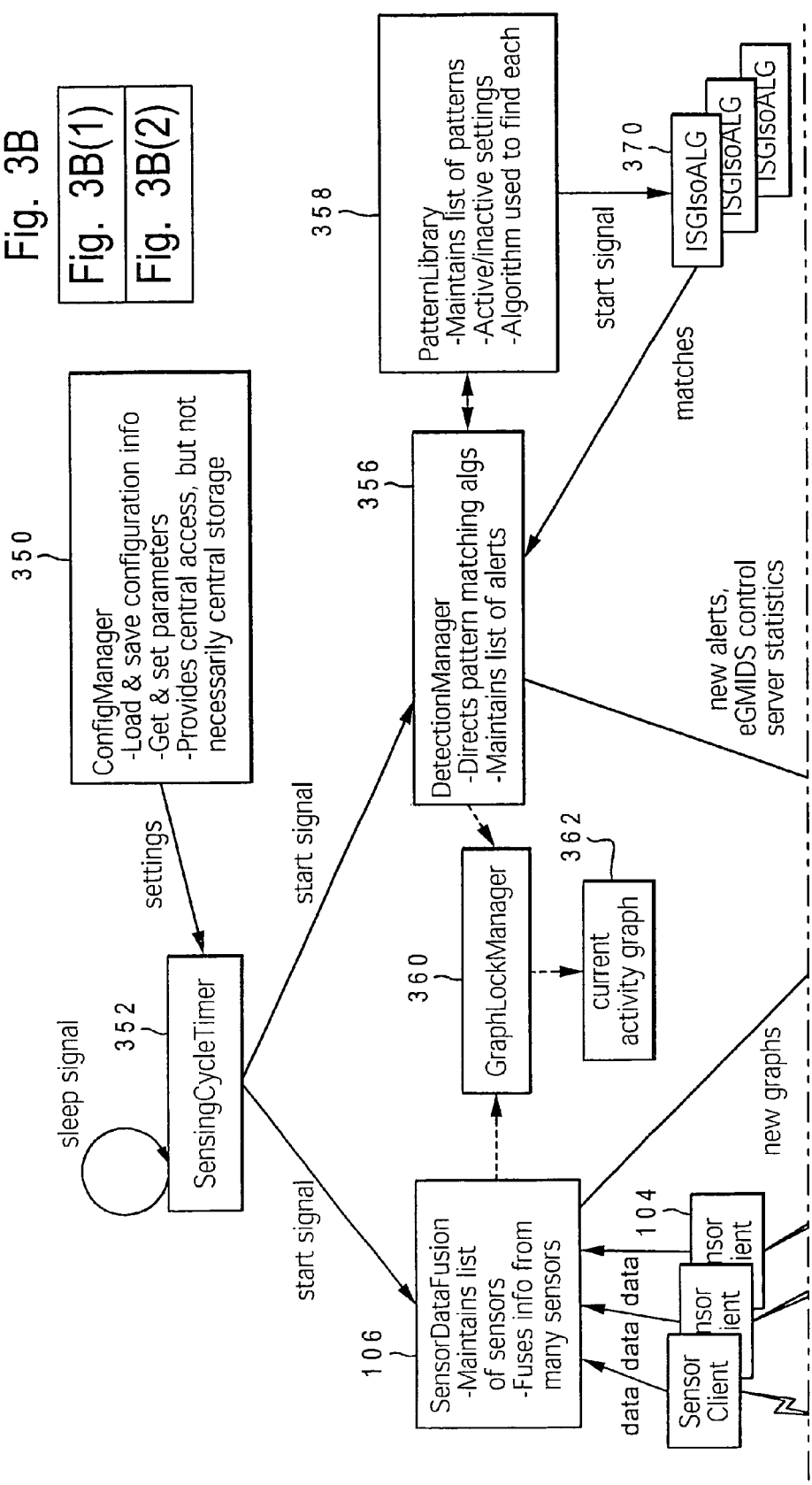
FIGS. 3B(1) and (2) provide a flow diagram representation of interactions between specifically coded manager functions within eGMIDS utility of eGMIDS control server according to one embodiment of the invention.

Referring now to FIGS. 3B(1) and (2), there is illustrated an internal view of the interchange between functional components of eGMIDS control server 102 (provided via eGMIDS utility) according to one embodiment. Arrows represent the direction of signals/commands and data exchange among the functional blocks (rectangles). Configuration manager 350 completes functions such as loading and saving configuration information, obtaining and setting parameters, and reporting and changing settings, in order to provide central access to eGMIDS configuration information to other modules in the utility. Configuration manager 350 also provides the settings for sensing cycle timer 352, which is a periodic timer that places the system (eGMIDS activation functions) in a "sleep" mode in between activations. When timer 352 expires (i.e., system returns from sleep mode), a start signal is passed to both sensor data fusion 354 and detection manager 356, to activate both functions. Sensor data fusion 354 maintains and operates on a sensor list stored by the configuration manager 350. Remote sensors servers 133, 137, 141 are communicatively coupled to local sensor clients 104. Sensor data fusion 354 maintains a list of sensors and fuses/combines information from the plurality of sensors to generate the current activity graph 362.

Access to the current activity graph 362, which must be coordinated between sensor data fusion 354 and detection manager 356 is controlled by graph lock manager 360. Sensor data fusion 354 forwards current activity graph 362 to activity archive 364, which stores the graphs. In one embodiment, activity archive 364 is a central storage repository for multiple types of information, including current and past activity graphs, associated alerts, and a performance statistic history for the eGMIDS control server 102.

Activity archive 364 interchanges requests and results with visualization servers 118, which are communicatively connected to local visualization client 320 and remote visualization clients 322. Visualization manager 368 manages the collective operation of multiple visualization servers 366. Visualization manager 368 maintains lists of active visualization servers 366, a list of unallowed clients ("black list"), and manages server threads that handle client requests. In one embodiment, visualization manager 368 provides both unrequested ("push") and requested ("pull") information to visualization clients 320, 322 through visualization servers 366. In one embodiment, graphs are sent directly to graph archive 364 by sensor data fusion 354 before the pattern matching is completed. Also, in one implementation, an alert flag (e.g., "detection in progress") is displayed on the analysis and administration GUI 116 and visualization clients 120, 122 while detection is ongoing. Finally, detection manager 356 maintains a list of alerts and modifies the activity graph as the activity graph is searched to mark the alerts discovered within the activity graph, and the modified graph is stored in activity archive 364.

When the "start" signal is received at detection manager 356 from sensing cycle timer 352, detection manager 356 initiates threat detection by subgraph isomorphism detection (i.e., pattern matching algorithms). Detection manager 356 queries pattern library 358, which maintains a list of threat patterns, an indication of which threat patterns are active or inactive, indication of which search algorithm 370 should be utilized to find each threat pattern, and configuration information for those algorithms. Detection manager 356 triggers the search algorithms 370, which in turn provide their results to detection manager 356 in the form of threats detected in the graph. Detection manager 356 generates lists of threats (alerts) in the activity graph and performance statistics on the eGMIDS control server. This information is transmitted to activity archive 364 for storage.

D. Activity Graph Generation (1) Sensors

Figure 4A:
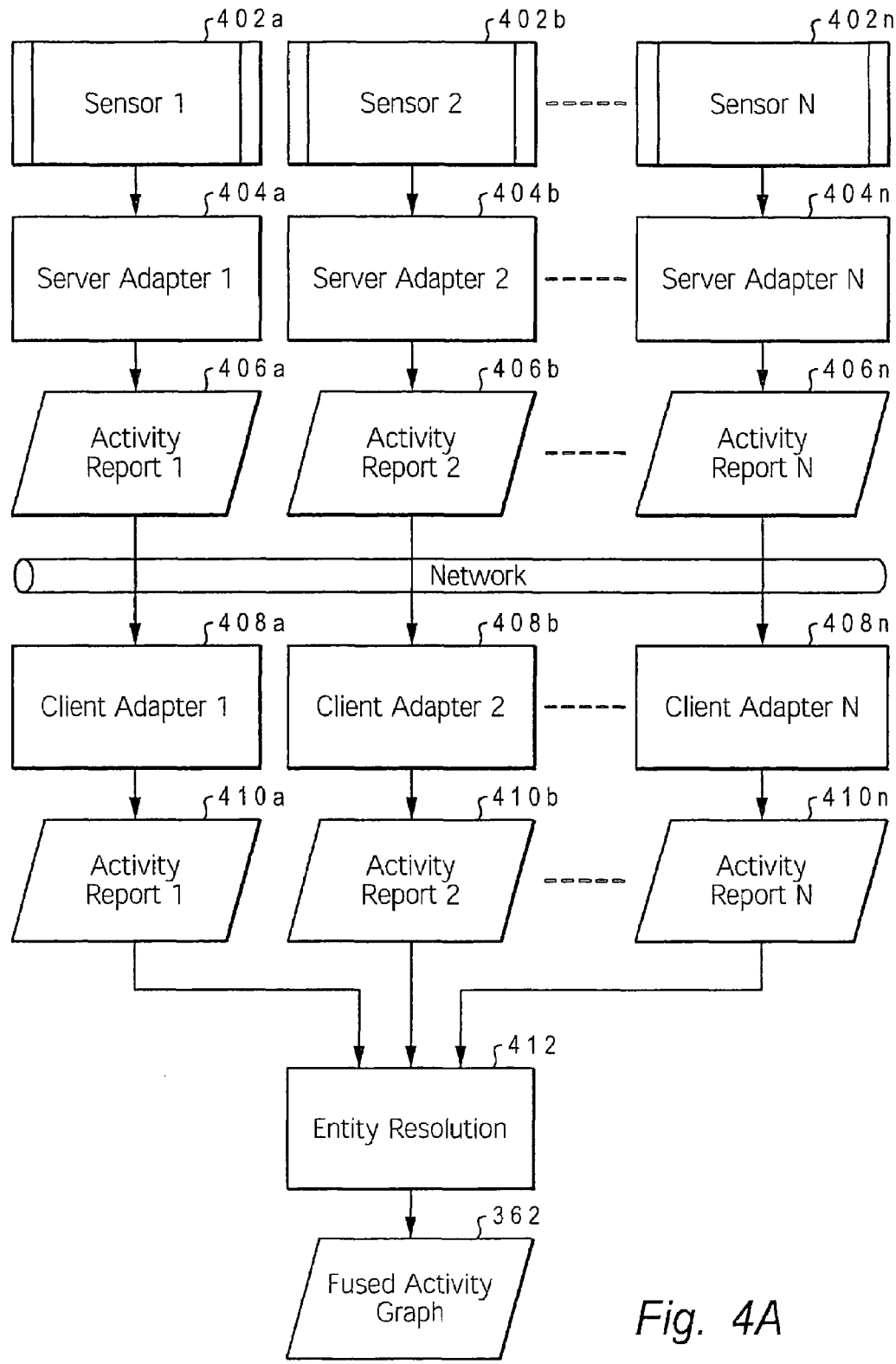
FIG. 4A illustrates an example layout of sensors within multiple remote hosts (nodes) and the transfer of data/information obtained from the sensors and processing into a fused activity graph according to one embodiment of the invention.
Figure 4B:
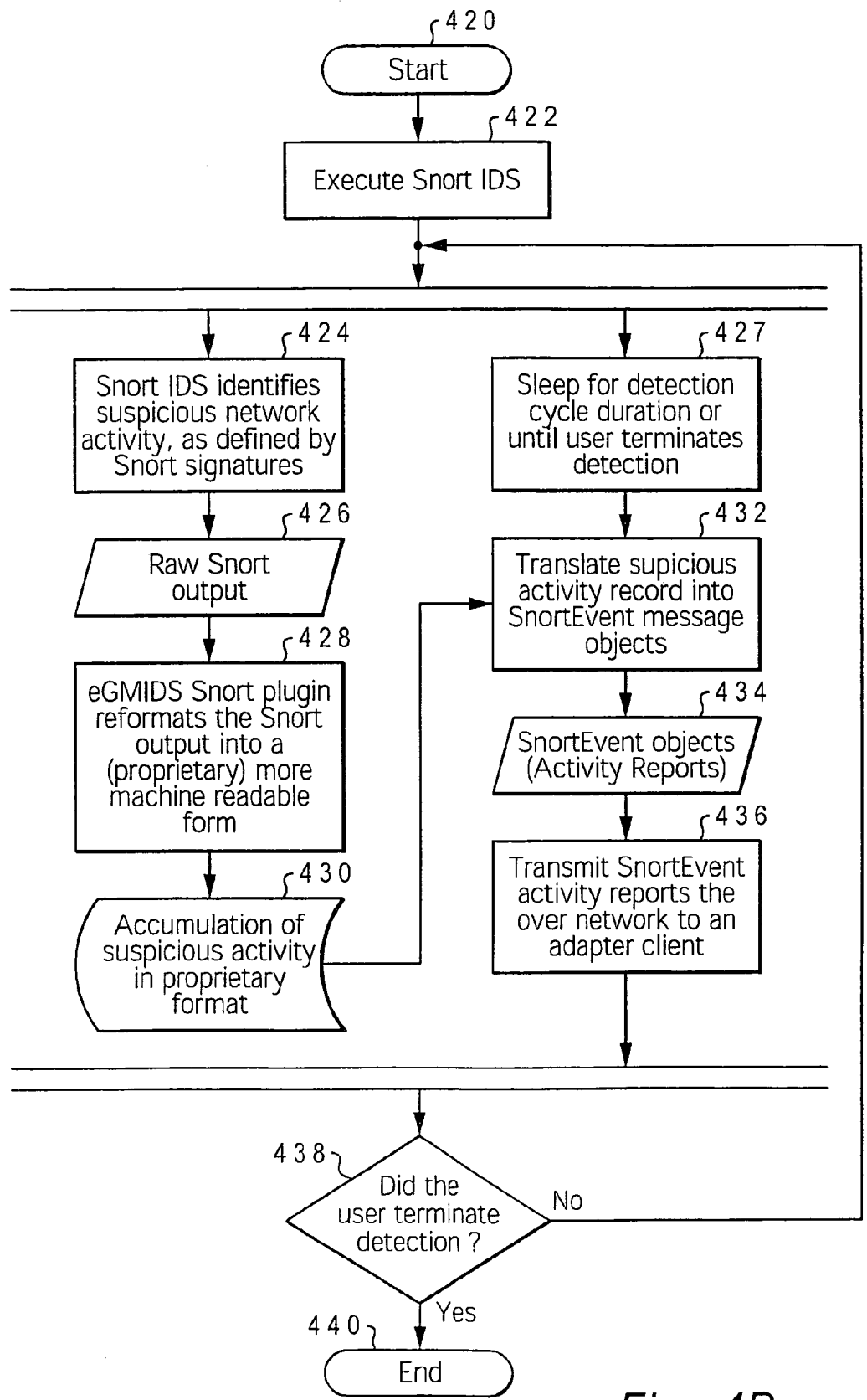
FIG. 4B is a flow chart of the process of sensor data retrieval by a Snort sensor according to one embodiment of the invention.
Figure 4C:
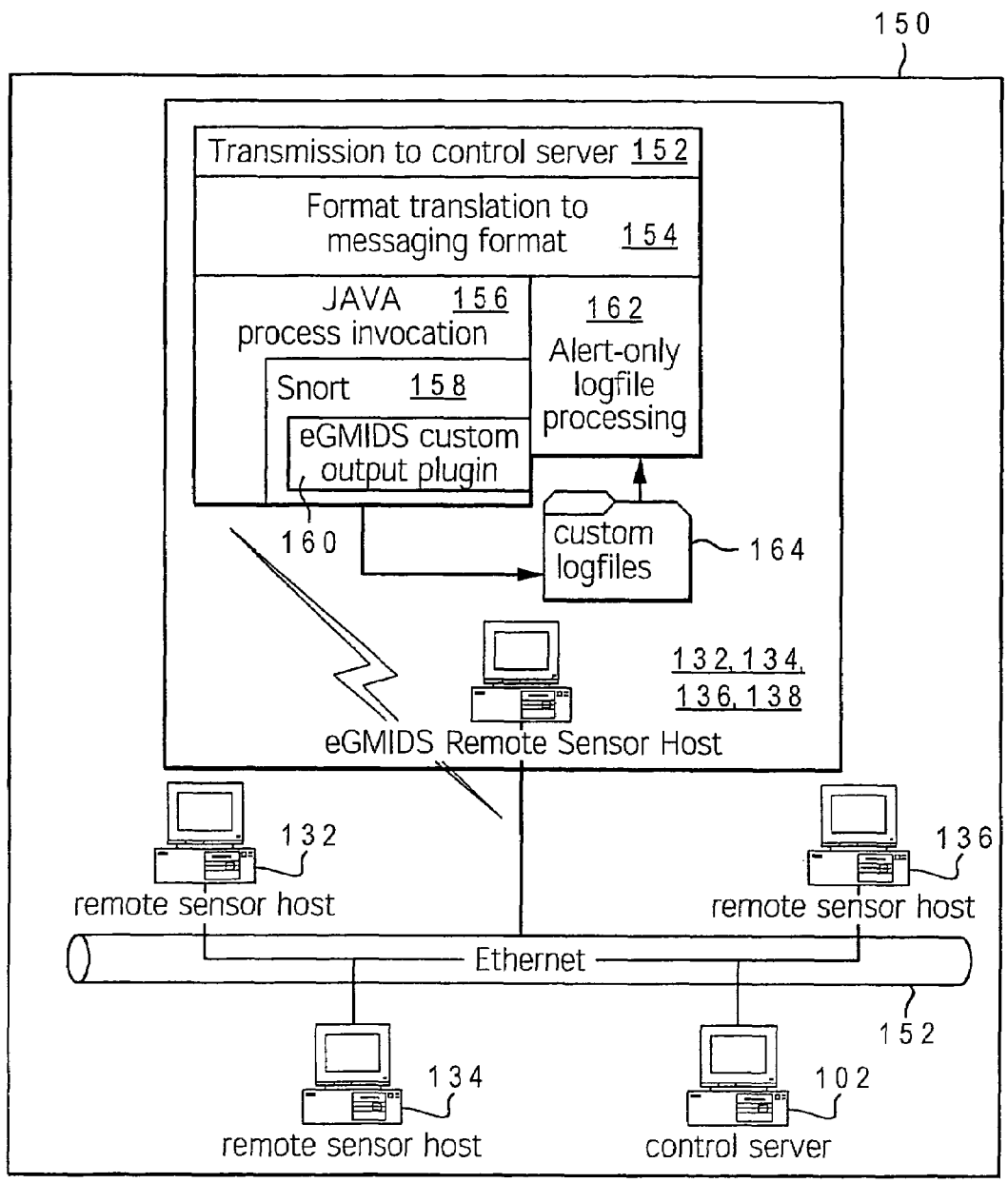
FIG. 4C is a block diagram representation of a local area network (LAN) connectivity of a Snort-based remote sensor server/hosts connected to other remote sensor hosts and an eGMIDS control server according to one embodiment of the invention.
Figure 4D:
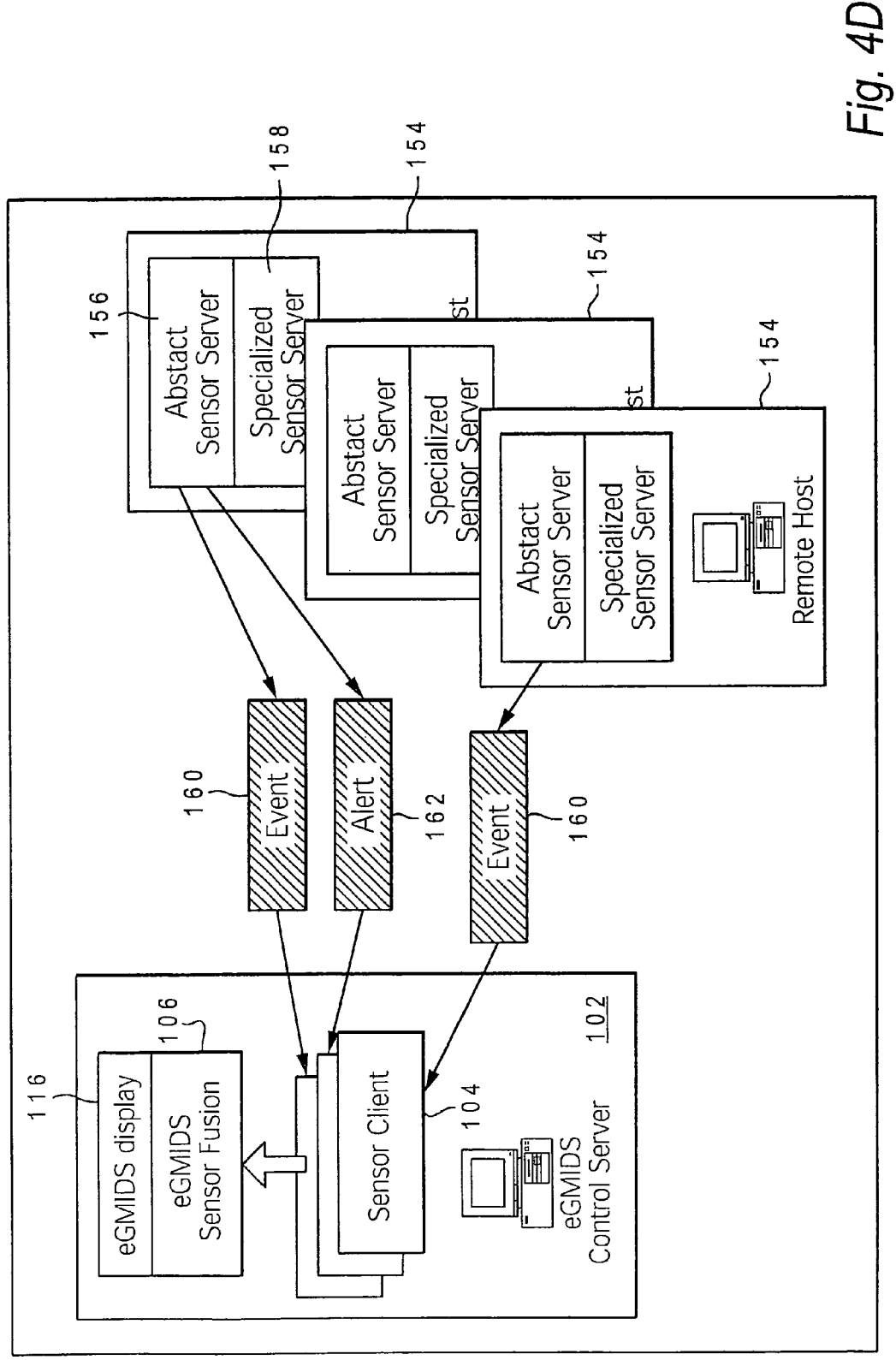
FIG. 4D is a block diagram representation of a transfer/transmission of events and alerts from secondary remote sensors (which may be of many different types) to sensor clients of eGMIDS control server according to one embodiment of the invention.

The intrusion detection functionality of eGMIDS relies on a graphical representation of the network and associated network (or host device) activity. An eGMIDS activity graph is generated utilizing data related to the network nodes (remote hosts and local host devices) and activity occurring at/between each host device. The activity data for each host device is detected by specialized sensors at the respective devices across the network. FIGS. 4B, 4C, and 4D illustrate the processes by which relevant data is collected at a remote host and prepared for transmission to the control server. FIG. 4A illustrates an example flow diagram of the overall detection and forwarding of this data from multiple remote hosts to the control server and the eventual fusion of the data into an activity graph. Within FIG. 4A, functions are represented by rectangles, data utilized/generated by function blocks are represented by parallelograms, and data stored permanently in persistent storage are represented by "rectangles" with curved left and right edges (e.g., 430).

In order to generate an activity graph, eGMIDS relies on a series of sensors placed on the various hosts or network segments being monitored. These sensors are localized IDSes, and in one embodiment, commercially available IDSes are integrated into eGMIDS. The eGMIDS is configured to use multiple different sensors and/or sensor types, with each sensor provided with a unique eGMIDS adapter for converting sensed/detected activity of interest (activity data) at the remote host device into an eGMIDS format for transmission to the control server.

FIG. 4A provides a diagrammatic view of utilization of multiple sensors 402a-402n to detect and transmit activity data to generate a fused activity graph 362. All components and associated functions occurring above the network line exist at the remote host servers, while the components and related functions below the network line are provided at the eGMIDS control server 102. In order to achieve the eventual integration into the fused activity graph 414, specialized eGMIDS control server adaptors 404a-404n are written to translate the output from respective sensors 402a-402n. Depending on implementation, some sensors 402a-402n may be third party sensors enhanced/adapted to detect eGMIDS-specific activities. However, many of the sensors utilized may be proprietary eGMIDS sensors designed specifically for eGMIDS application. Sensors 402a-402n collect information on relevant digital activity or state on a particular host or on the network in general.

According to the described embodiment, adapter servers 404a-404n wrap and/or modify the IDS sensors and translate information about digital activity into the eGMIDS message format. These are transmitted via the network to server (client) adapters 408a-408n (somewhat synonymous to 104). Each server adapter 408a-408n translates the output data into an activity report 410a-410n. Accordingly, activity reports 410a-410n are objects that store relevant information from the IDS sensors 402a-402n that have been transmitted to eGMIDS control server 102 and translated into proper eGMIDS format. These activity reports 406a-406n are stored in an eGMIDS format that can be used by sensor data fusion 106 (via Entity Resolution 412) to generate nodes and edges in current activity graph 362.

An expansive list of sensors are utilized and/or supported within eGMIDS. Among these sensors are several conventional sensors, such as Snort and Tripwire, and several proprietary (eGMIDs) sensors, as described below. It is understood that the sensors presented herein are provided simply for illustration and not meant to imply any limitation with regards to the types of sensor(s) utilized within eGMIDS, as many other types of sensors may be adapted to operate within eGMIDS.

(a) Snort

Snort is a third-party rule-based IDS that detects threats at the packet level. Snort analyzes packets based on a set of rules. If a packet matches any one of several predefined rules contained within the Snort rules lists, the packet is flagged and reported as a Snort Alert. In one embodiment, the Snort rule list comprises rules from Snort distribution, which are amended and/or updated or expanded to include eGMIDS-specific rules. The eGMIDS-specific rules may be manually added by the eGMIDS administrator or dynamically pushed from eGMIDS control server when the remote host installs the Snort sensor or is established on the network. An agent (or process) is established on the remote host and continues to monitor the remote host for specific activity data of interest. When Snort is executing on a remote host that host is referred to herein as Snort sensor server. Both terms are utilized interchangeably throughout the description of Snort and/or Snort sensor server functionality.

Referring now to FIG. 4C, which illustrates Snort-based remote host 138 on a local area network (LAN) 150. LAN 150 comprises multiple remote components (e.g., eGMIDS control server 102 and remote hosts 132 . . . 138) coupled via Ethernet 152 to Snort-based remote host 138. Ethernet 152 of FIG. 1B provides direct wired connection between all illustrated components; However, it is understood that other types of connection, e.g., wireless connection, of devices is also possible in alternate embodiments of the invention.

Snort-based remote host 138 is illustrated with several software modules that enable host functionality as well as eGMIDS activity sensing and data packaging functionality. Among the modules illustrated are: transmission module 152 for transmitting sensed (and packaged) data to eGMIDS control server 102; format translation module 154 for translating sensed activity data into 21m messaging format; alert-only logfile processing module 162, and Java process invocation module 156, which includes Snort 158 and eGMIDS customer output plug-in 160. The eGMIDS custom output plugin 160 references and updates custom logfiles 164, which stores the type/signature of data activity that is to be sensed by Snort 158. The specific activity that is of interest is inputted from the custom logfiles 164 to alert-only log file processing module 162.

Snort Alerts generated by the third-party Snort IDS are converted into the SnortEvent eGMIDS format by Snort Adapter Servers (e.g., adapter server 404a). At the eGMIDS control server, SnortEvents are incorporated into the activity graph 362 as nodes connected to both the source host and destination host. With eGMIDS, several custom Snort rules are written that indicate certain types of activity useful in threat pattern writing.

According to one embodiment, a proprietary eGMIDS-specific "output plugin" is written to modify the behavior of Snort and format Snort alerts in a machine-readable format. The plugin is compiled into the Snort source code. The Snort Sensor Server processes the output into SnortEvents that are sent back to eGMIDS control server.

Also, in this embodiment, eGMIDS is able to translate Snort threat rules into threat patterns to be used directly by eGMIDS. When this translation is completed, eGMIDS tracks individual packets in its activity graph. When Snort is itself utilized as a filter, eGMIDS is required to track only alerts, thus reducing the size of the graph to be searched. This latter embodiment is a more efficient form of detection in some implementations and is applicable to integration of other external IDSes. The eGMIDS threat detection algorithms utilize Snort alerts in composition with other alerts according to defined threat patterns.

FIG. 4B gives an overview of one embodiment in which eGMIDS harnesses Snort as a sensor (i.e., a remote host with a Snort sensor executing thereon). First, eGMIDS runs Snort as an independent thread, with a special eGMIDS plug-in to alter the output into an eGMIDS-readable format, which is transmitted over the network to a sensor client 104. Sensor data fusion 106, 354 then processes the activity information and integrates it with data from other sensors to form activity graph 362.

Referring specifically to FIG. 4B, the process begins at block 420 and proceeds to block 422, which shows the Snort sensor server executing the Snort IDS. The Snort sensor server is able to operate Snort IDS on either "live" or pre-recorded network traffic. The activities in blocks (424, 426, 428, and 430) may operate in parallel (at the same time) as block 427. At block 424, Snort IDS identifies suspicions network activity, which are defined by pre-established Snort signatures. Then, as shown at block 426, raw Snort output is generated. Following, the eGMIDS Snort plug-in reformats the Snort output into a proprietary form, which is more machine-readable, as depicted at block 428. Following, Snort sensor server accumulates the suspicious activity in proprietary format, as depicted at block 430.

Snort sensor server performs blocks 424, 426, 428, and 430 for the duration of the detection cycle or until the user terminates the detection cycle, as provided at block 427. In one embodiment, the Snort sensor server waits for a prescribed period of time while the Snort IDS system detects and the eGMIDS plugin accumulates the suspicious activity. Once the detection cycle duration is concluded (or the user terminates the detection cycle), the suspicious activity is translated into SnortEvent message objects (or activity reports 434), as shown at block 432. Then, the SnortEvent activity reports are transmitted over the network to the specific adaptor client of eGMIDS control server corresponding to the remote sensor server. A determination is then made at block 438 whether the detection cycle has been terminated by the user. If the user has terminated the detection cycle, then the process ends at termination block 440. Otherwise, the process of monitoring the remote host server(s) for suspicious activity continues, beginning with blocks 424 and 427 operating in parallel.

(b) Tripwire

Figure 4E:
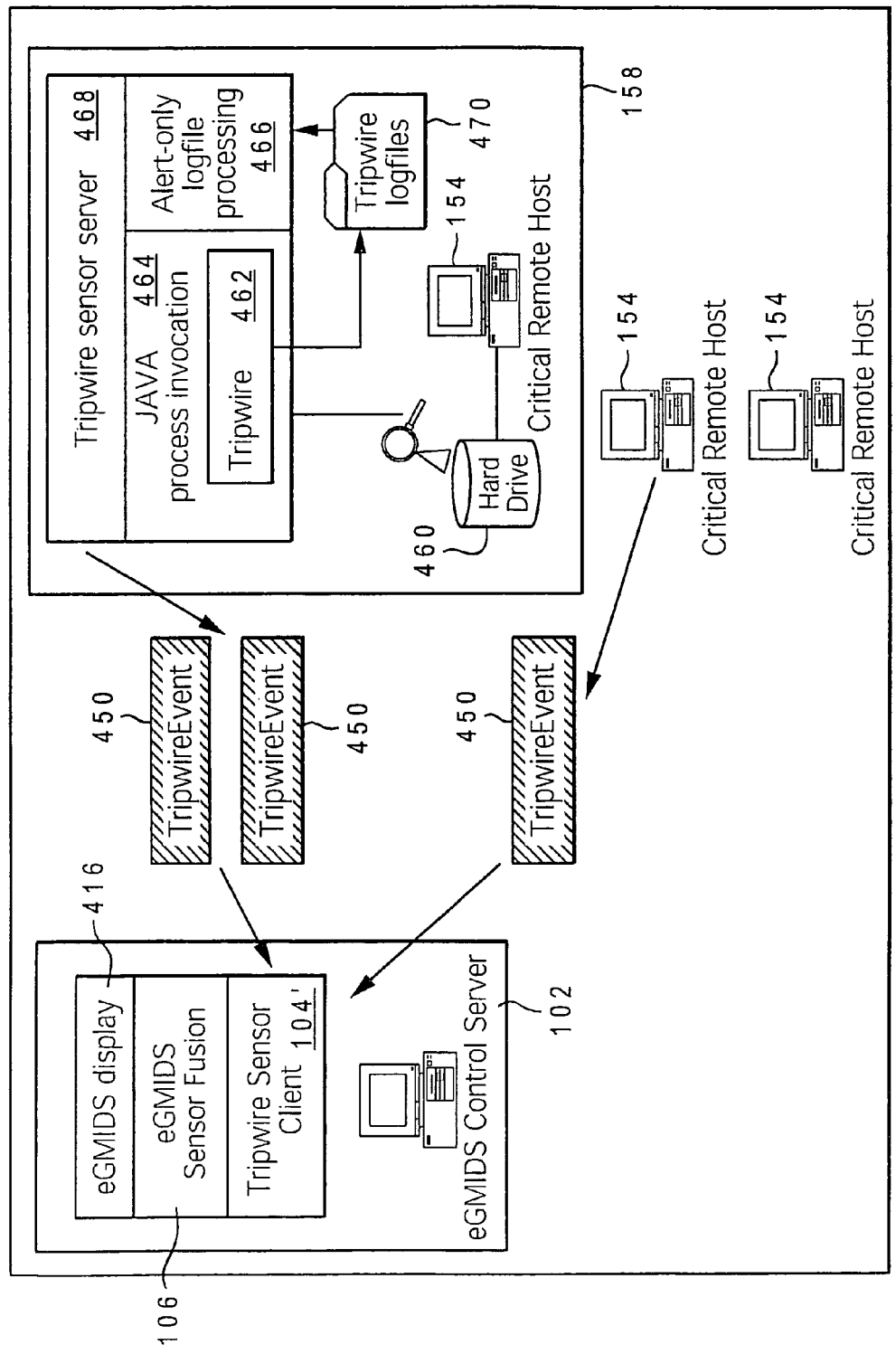
FIG. 4E is a block diagram representation of the retrieval and transfer of event data detected with a Tripwire sensor at a secondary host equipped with an eGMIDS adapter for the Tripwire sensor according to one embodiment of the invention.

Tripwire is an event-based IDS that tracks access to sensitive files and machines. Tripwire activates an alarm feature (alert) whenever files that are being monitored are accessed, modified or deleted. FIG. 4E illustrates a component view of a Tripwire sensor configured to provide activity reports usable by eGMIDS utility for eventual data fusion. Tripwire sensor server 468 comprises a plurality of software applications, including Tripwire 462 and Java process invocation 464. Additionally, Tripwire sensor server 468 comprises an alert-only logfile processing module 466 that receives tripwire logfiles 470 generated by Tripwire 462. Finally, remote host includes a hard drive 460 with files that are monitored by Tripwire. In one embodiment, the hard drive is also utilized to store Tripwire events and associated rules.

When Tripwire sensor server 468 registers an event, the TripwireEvent(s) 450 is/are wrapped in the proprietary package (described below) and immediately forwarded to eGMIDS control host 102. eGMIDS control host 102 comprises Tripwire sensor client 104' (a specific type of the multiple sensor clients 104 previously described), eGMIDS sensor fusion 106, and eGMIDS display 416, which may be synonymous with GUI 116.

The Tripwire sensor (Tripwire sensor server) integrates information from the open-source version (Unix only) of Tripwire, a file monitoring utility that checks for modifications and updates to files that may indicate such things as a rootkit or other attack. At a specified interval (e.g., 10 minutes), the Tripwire sensor initiates three successive processes—the "scan", "report", and "update" modes of Tripwire. "Scan" examines all files designated for scrutiny (such as the password file), and compares all file attributes (e.g., last modified) to known values. In the report phase, Tripwire prints all such changes. The third phase updates known values for all file attributes.

During the report phase, the eGMIDS sensor collects the information and homogenizes it for later processing by the eGMIDS control server. Tripwire sensor adaptor server 404*a* ... 404*n* constructs events (TripwireEvent) representing each type of modification reported by Tripwire, such as "Modified file: passwd; New attribute: Last Modified Dec. 5, 2005". These events are transmitted to the eGMIDS control server, which uses sensor data fusion 354 to integrate them into the activity graph 362 as nodes and edges. Each integrated "Tripwire Event" node is connected to a "Host" node via a single edge. eGMIDS patterns may thus be written to look for modifications to specific files on various hosts.

In implementation, eGMIDS may utilize Tripwire alerts as part of larger threat patterns in order to filter out irrelevant alerts. For example, in a coordinated insider-outsider attack, an insider with access to a password file might change a key password to allow an outsider to login, thus compromising the security of the network. In this context, the Tripwire alert provides a crucial piece of information, when considered within the surrounding context.

(c) Traffic Summary Sensor

The Traffic Summary Sensor is a proprietary sensor of eGMIDS. Traffic Summary Sensor provides the functionality of LibPCap/TCPDump in a format that is less verbose and thus more conducive to analysis by eGMIDS. LibPCap/TCPDump records the header and payload of all traffic on a given network. This information can then be used for further analysis by eGMIDS. In general, the Traffic Summary Sensor replaces much of this functionality for the purposes of eGMIDS. Traffic Summary Sensor tracks the volume of traffic moving through each point in the network, as well as the source and destination of the traffic data. Network activity information (or "flows") is thus summarized, instead of representing every detail of every packet in the activity graph 362.

(d) Other Sensor Systems

In one embodiment, eGMIDS also integrates sensor data from other sensors, including, for example, SHADOW, Honeyd, ZoneAlarm, ManHunt and other unique IDSes. These systems are harnessed as sensors by eGMIDS and their detection capacity added to functionality of eGMIDS, making eGMIDS a more versatile and powerful tool for security analysts.

(e) Email Sensor

In one embodiment, an email sensor is provided that tracks emails between users on the network. In one embodiment, email sensor simply monitors the sender and receiver of emails. Optionally, methods may also be provided that monitor the content for key words (with consideration for privacy concerns and policies) that may be associated with a threat when placed in proper context, given the sender's and/or recipient's other activities. Similar sensors may be provided for chat logs (ICQ, AOL Instant Messenger, Microsoft Messaging, Google Talk, etc.) that may simply identify the occurrence of an exchange of communication between users.

(f) Keystroke Sensor

In one embodiment, a sensor is provided that can distinguish users at a host based on the timing of their keystrokes. This information may be continually incorporated into the activity graph, or may be used as secondary evidence on request.

(g) Encrypted Session Detection

In yet another embodiment, a sensor is provided that determines whether or not a particular TCP session is transferring encrypted or plain text data, based on statistics of the data being transferred. Utilizing this tool as a sensor enables eGMIDS to detect encrypted sessions on ports that should be plain text and vice versa. This information is then utilized as additional context to distinguish between threatening and benign activity.

(h) Host Device Fingerprinting

In yet another embodiment, a third-party clock skew fingerprinting tool/technique is applied in which an individual remote computer may be identified even if it is sending or receiving data under multiple IP address aliases. This information enables eGMIDS to restructure the (possibly multiple) nodes and edges representing that host to more accurately reflect its activity. This technique enables eGMIDS to expose attackers that are trying to disguise their attacks by spreading them across multiple source IPs.

(2) eGMIDS-Specific Data Packaging and Transmission Protocol

Referring now to FIG. 1A, clients 132 . . . 138 are communicatively connected to eGMIDS control server 102 via one or more different types of connections, such as wired LAN connection, wireless connection, and so on. However, key to the implementation of the sensor(s)' data transmission functions is the utilization of a specialized packaging for activity data being transmitted from each remote host 132 . . . 138 to eGMIDS control server 102. In the illustrative embodiment, a 21Messaging (abbreviated as "21m") transfer protocol is implemented between remote hosts 132 . . . 138 and eGMIDS control server 102.

The 21m protocol is referred to herein as eGMIDS data format. Each different sensor server produces different types of events (e.g., SnortEvent, TripwireEvent). These events are the data that is transmitted over the network. When the events arrive at the eGMIDS control server, the sensor data fusion component is programmed to incorporate each different type of event into the activity graph. The specific method of transmission (i.e., the transmission protocol utilized to communicate between a particular remote host and eGMIDS control server 102) may vary depending on the connection methods and the specific remote host.

FIG. 4D illustrates the transmission path of events and alerts from sensors on remote host systems 154 (hosts 132 . . . 138) to eGMIDS control server 102. Each remote host comprises abstract sensor server functionality 156 and specialized sensor server functionality 158. Abstract sensor server functionality 156 generates events 160 and/or alerts 162 from a host and transmits the event 160 and/or alert 162 to a respective sensor client 104 of GMIDS server 102. The specialized sensor server functionality on each remote host depends on the specific type of sensor server. Sensor clients 104 receive the events and alerts and assess the data to the eGMIDS sensor fusion mechanism 106. The events and alerts are also outputted to eGMIDS' analysis and administrative GUI 116.

As shown by FIG. 4C, all communication between remote hosts 132 . . . 138 and eGMIDS control server 102 is packaged within a 21m format, irrespective of the type of sensor utilized at the particular remote host. Each sensorServer function 133, 135, 137, and 141, which have unique characteristics depending on the type of sensor being implemented at the particular remote host 132 . . . 138.

(3) Generation of Fused Activity Graph

Returning to FIG. 4A, in one embodiment, activity reports 406a-406n are automatically transmitted via the network to respective client adaptors 408a-408n at eGMIDS control server 102. Client adaptors 408a-408n generate activity reports 410a-410n corresponding to host activity reports 406a-406n, and client adaptors 408a-408n passes these activity reports 410a-410n to entity resolution component (EntityResolver) 412. EntityResolver 412 is a primary component of sensor data fusion and is designed to interact with activity reports 410a-410n in order to translate the data within the activity reports 410a-410n into a graph representation and incorporate the translated data into the combined activity graph. EntityResolver 412 includes functionality to determine which elements within an activity report are already represented by a node or edge in the activity graph, and which elements require new nodes or edges to be created. By maintaining this knowledge in EntityResolver 412, activity reports 410a-410n are able to remain independent of each other, but are still able to be utilized to generate a fused activity graph 414 where entities are only represented once. Fused activity graph 414 is the result of the sensor fusion process and represents the combination of data from multiple heterogeneous sensors.

E. Graph Matching Intrusion Detection Methods

According to the illustrative embodiment, eGMIDS produces graphs internally to encode the entirety of its acquired/detected knowledge about the network environment (devices and associated activities). In the illustrative embodiment, the eGMIDS activity graph includes: (a) "nodes," which represent hosts, users, files, or events, and (b) "edges," which represent communications (packet flows between hosts), event participation, file location, or user account location.

The specific utilization of graphs in eGMIDS is unique among IDS methods. The eGMIDS takes advantage of the topology of its internal graph representation to allow for the detection of previously known as well as novel threats. The eGMIDS utilizes its generated activity graph structure as a primary means for threat detection.

The activity graph generated by eGMIDS graphing component/functionality comprises a plurality of nodes and edges. In one embodiment, nodes refer to specific IP addresses, while edges refer to interconnections between nodes in the graph. Edges may represent any relevant connection between two entities in the graph, be it specific packets sent over the network, or alerts from other IDSes, or any other relationship. With this flexibility, the analyst is able to configure eGMIDS to search for any circumstance or combination of occurrences considered relevant by the analyst. According to the illustrative embodiment, each node or edge may also define attributes possessed by that node. These attributes may then be utilized to improve the accuracy of pattern searches. In addition, eGMIDS provides the facility to define constraints on searches. These constraints use node and/or edge attributes to refine search criteria and improve the detection of real threats while decreasing false alarms.

The eGMIDS constraint mechanism allows eGMIDS to represent the same kind of timing constraints between events (as with conventional network graph representations), but with the added ability to represent other properties that constraints in other systems are not able to represent in their graphs. Examples of these other properties that may be represented utilizing an eGMIDS-generated activity graph include: IP address masking, counts, and restrictions on protocols.

1. eGMIDS Applied

Figure 5A:
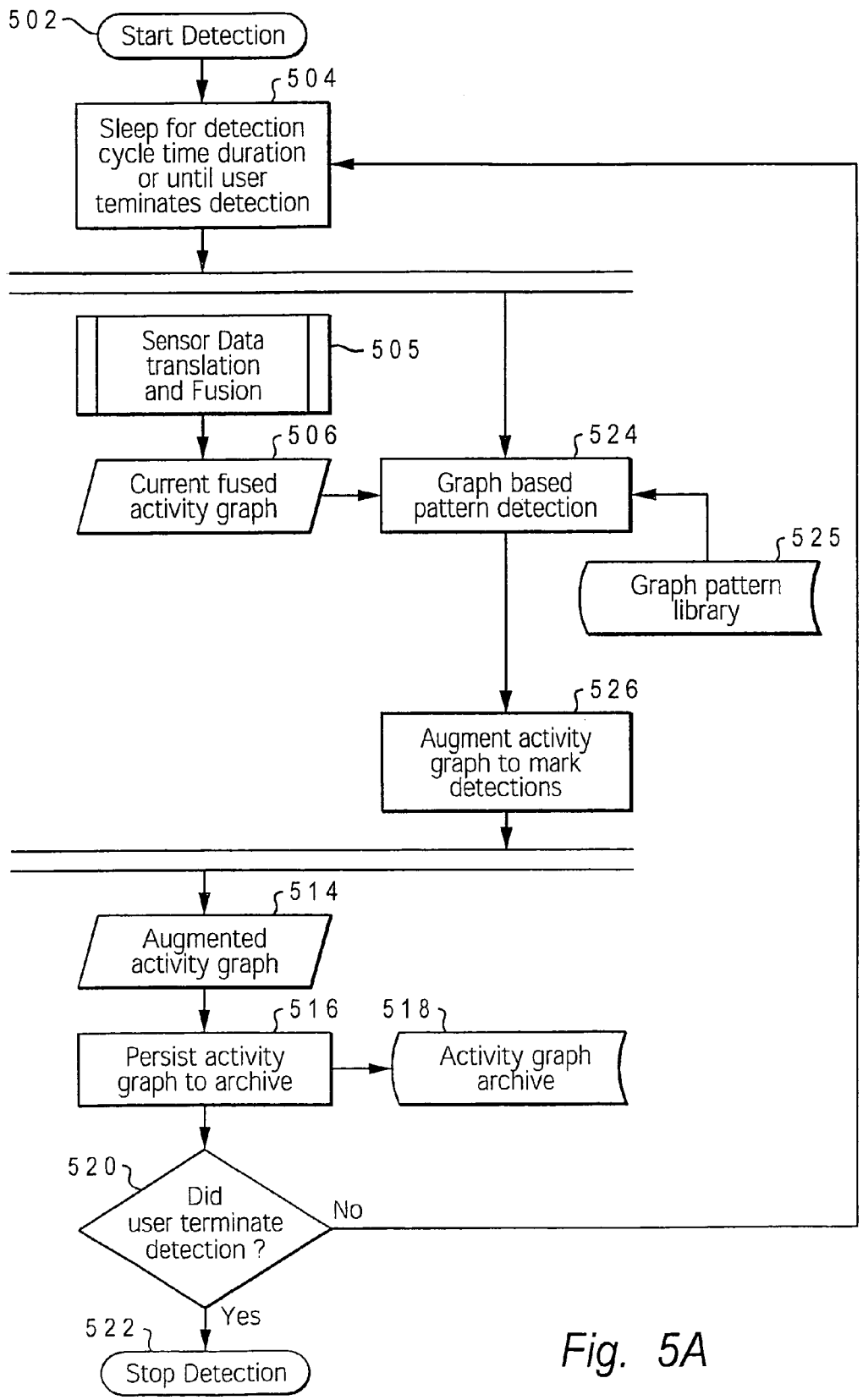
FIG. 5A illustrates a process flow diagram of the eGMIDS detection cycle according to one embodiment of the invention.

Referring now to FIG. 5A, there is illustrated the eGMIDS threat pattern detection cycle. The process begins at block 502 at which the detection cycle is initiated. The eGMIDS matching engine sleeps for the period of time in which sensor data fusion 505 is ongoing. This period of time is known as the detection cycle, as shown at block 504. That is, the detection process repeatedly waits for a prescribed period of time (or until the user terminates detection, whichever occurs first) while the sensor fusion process accumulates the activity data and generates the network activity graph. Once the detection cycle duration is completed, the results of activity data translation and fusion 505 are represented in the current fused activity graph 506, which is made available to the threat detection processes (the eGMIDS matching engine) at block 524.

According to the illustrative embodiment, at least one threat detection process is then run against the fused activity graph. The graph-based pattern detection process is described and presented here solely to provide the general flow of the eGMIDS detection operation. At block 524, graph-based pattern detection is activated. As utilized herein, graph-based pattern detection is a threat/pattern detection method based on graph matching (i.e., subgraph isomorphism). Graph-based pattern detection receives an input from a graph pattern library 525, which is developed offline by a subject matter expert (i.e., a person with knowledge of types of threat patterns, both known and possible), in one embodiment.

After threat instances have been detected, graph-based pattern detection augments the activity graph to mark those detections, as shown at block 526. Once the activity graph has been augmented (augmented activity graph 514) to record threats detected by the detection process, the eGMIDS utility persists the activity graph to an activity graph archive 518, as shown at block 516. The activity graph archive holds the network activity graphs, which are persisted to support future forensic (or other) analysis. Marking detected threats in the activity graph serves two purposes. First, it is a record of the location of suspicious activity. Second, later threat detection can build patterns based on earlier detections to detect more complex or multi-stage threat activity.

Following, a determination is made at block 520 whether the user has ended the detection process. If the user did not terminate the detection process, the entire process repeats beginning at block 504. Otherwise, if the user has terminated the detection process, the eGMIDS utility stops the threat detection at block 522.

2. Threat Patterns and Application within an Activity Graph

Figure 5B:
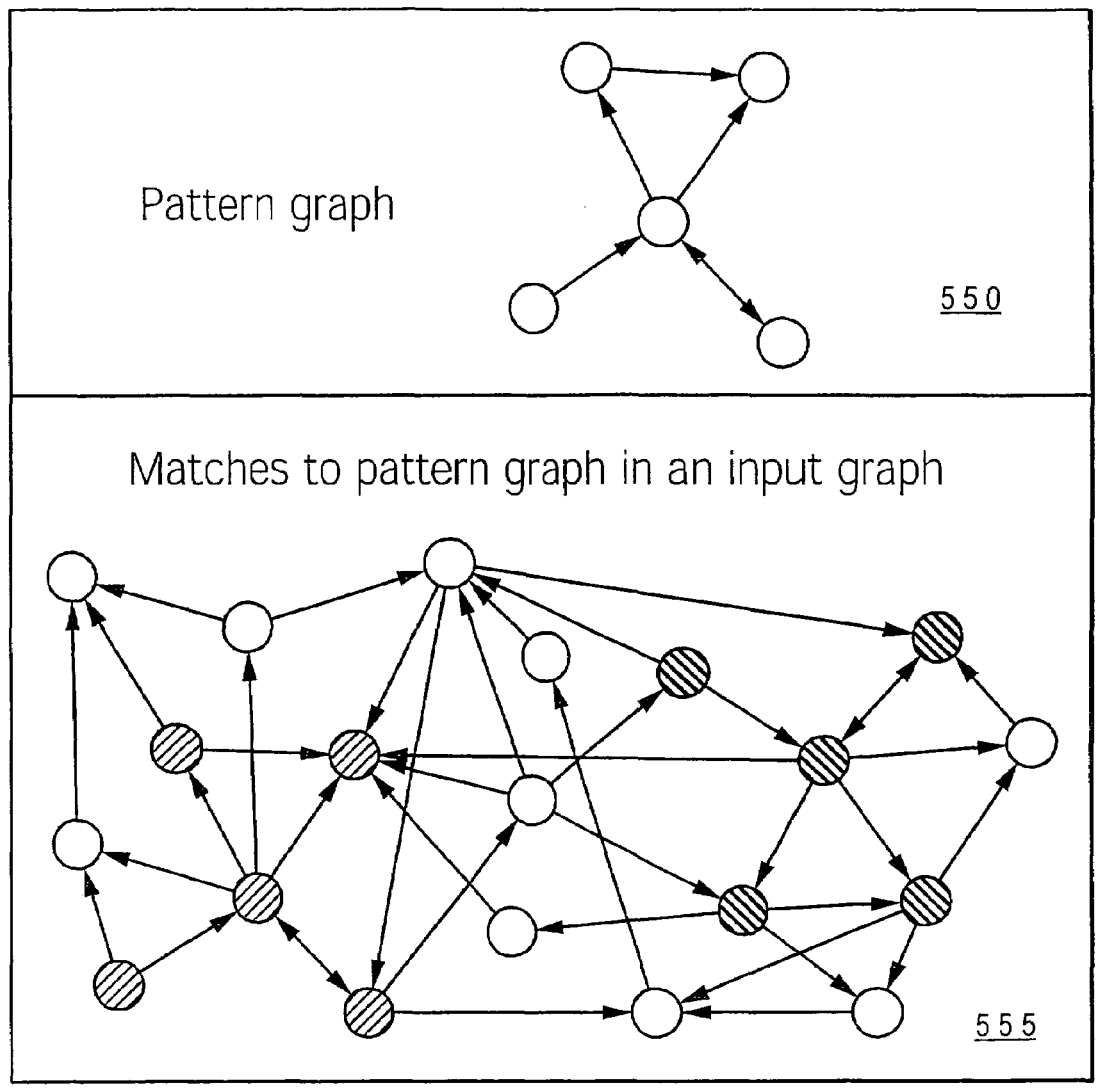
FIG. 5B illustrates an example threat pattern and match(es) within an activity graph according to one embodiment of the invention.

Within eGMIDS threat detection methods, threats are modeled as graphs, comprised by a set of entities and inter-relations between those entities. FIG. 5B illustrates a sample threat pattern and an example activity graph 555 generated by eGMIDS utility. Once threat pattern 550 is defined (i.e., within the archive of possible threat scenarios or created by the analyst or system administrator), threat pattern 550 may then be searched for as a subgraph isomorphism inside of activity graph 555. The illustration indicates eGMIDS' detection of two matches to this threat pattern 550 in the activity graph 555.

Figure 5C:
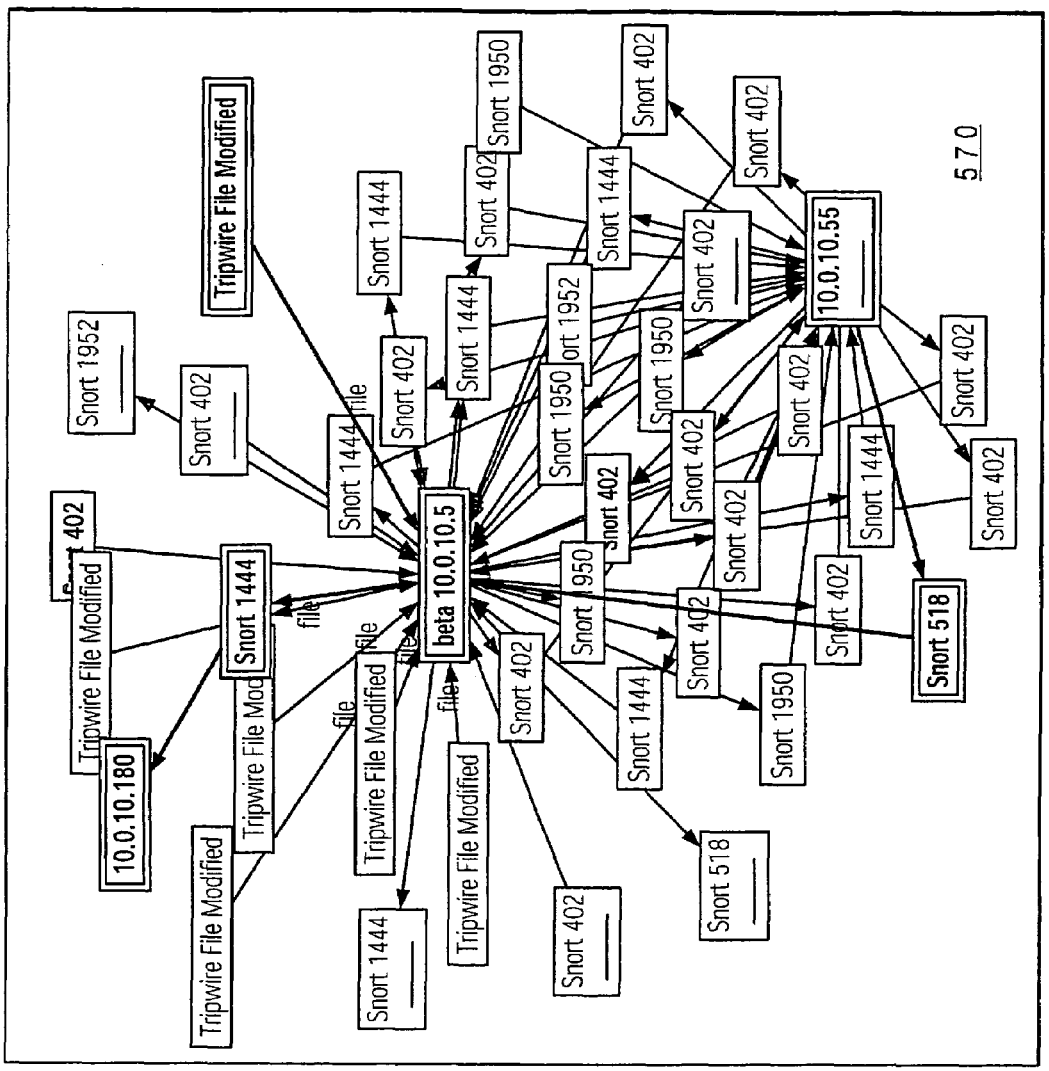
FIG. 5C illustrates a more specific application of threat pattern matching within a current activity graph according to one embodiment of the invention.
Figure 5C:
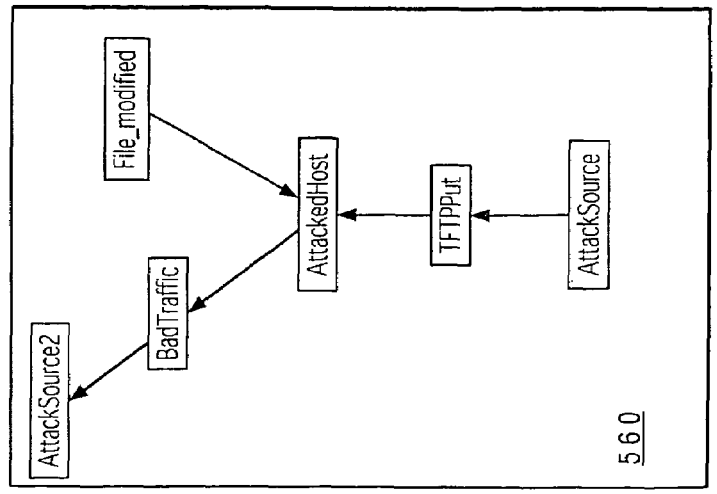

FIG. 5C further illustrates specific application of the subgraph isomorphism with a match of a defined threat pattern 560 within a current fused activity graph 570. The fused activity graph 570 comprises three IP addresses, 34 Snort alerts and six Tripwire alerts. Of these, by utilizing eGMIDS and the threat pattern 560, three IP addresses, two Snort alerts and one Tripwire alert are highlighted. Accordingly, only the two Snort alerts that are really significant are highlighted, and thus several false positives are avoided.

Within the illustrative embodiment, the boxes labeled AttackSource1, AttackSource2, and AttackedHost represent entities and can match any IP address, provided that all user-defined constraints are met. Also, the boxes labeled FileModified, BadTraffic and TFTPPut describe attributed relationships between the matched entities. In this illustration, these relationships refer to alerts from the Snort and Tripwire intrusion detection systems, which are easily integrated with eGMIDS. For example, File_modified is a Tripwire alert indicating that a sensitive file, such as one containing passwords, has been modified on the entity to which the password points. BadTraffic and TFTPPut are Snort alerts triggered when certain rule-based criteria are met.

The eGMIDS enables representation of threats whose activity graphs are any valid multigraph. A multigraph is a directed abstract graph that allows multiple edges between the same two nodes. Unlike other systems, eGMIDS places no restriction that the graph be acyclic (i.e., threat graphs may contain cycles). Also, eGMIDS provides general subgraph isomorphism capability making eGMIDS capable of supporting a large variety of threat patterns.

The eGMIDS provides the security analyst with the ability to define patterns of network interaction that represent potential threats. In addition to user-defined threat patterns, eGMIDS provides a threat library that contains a considerable number of previously defined threats. The system then attempts to locate approximate or exact matches to the threat patterns within the network that is being monitored. These patterns allow eGMIDS to take context into account when determining what is and is not a threat. The eGMIDS thus generates fewer false positives than conventional IDSes and provides a more secure network.

3. Graph Matching Engine

The eGMIDS utility comprises a graph matching engine that provides several different methods of matching templates of network hosts and activities (represented as nodes and edges in a threat pattern) to observed network hosts and activities (represented as nodes and edges in an activity graph). In order to locate potentially malicious activity within large activity graphs, the system allows the user to specify a pattern of activity that is to be considered anomalous or threatening, and the matching engine then tries to establish a correspondence between a graph representing observed activity and that threat pattern.

This method for finding/determining a match or correspondence between a graphical threat pattern and an activity graph is referred to as a subgraph isomorphism. The goal of the eGMIDS matching engine is to find specific regions of an input graph (representing observed network hosts and activities) that "match" a specified threat pattern (graph representing templates of activity that would be considered threatening). Formally, the goal of subgraph isomorphism is to find matches to a threat pattern with adjacency matrix $G_p$ within a larger input graph with adjacent matrix $G_i$. Matches are expressed in the form of a match matrix M, such that $G_P = MG_iM^T$, where elements of M must be in the set $\{0, 1\}$ and M may have at most one nonzero element in each row and column. The eGMIDS pattern matching algorithms support several extensions to this subgraph isomorphism activity described herein.

F. Threat Pattern Matching Algorithms

One key aspect of eGMIDS is that it integrates information from various sources (via sensor data fusion), providing for each piece of information the context within which it occurs. The eGMIDS threat detection processing of FIG. 5A may be applied within different sized environments. In order to allow eGMIDS processing in high-volume network environments that yield complex (or large) activity graphs, the greatest efficiency is provided by filtering incoming data using smaller and simpler IDSs, such as Snort and Tripwire. However, eGMIDS may further examine specific packet information, provided that certain criteria are met. This is accomplished by using a layered approach to the threat pattern definition, which is described in detail below.

With activity graphs potentially being very complex, conventional exhaustive algorithms are not able to solve the problem in reasonable time for particularly large graphs. To find subgraph isomorphisms, eGMIDS graph matching engine uses a combination of exhaustive and nonexhaustive search algorithms. According to the described invention, eGMIDS graph matching engine employs two major algorithms: (1) the Merging Matches algorithm, which is an exhaustive search used for small input threat patterns and (2) a fast genetic search for larger patterns. Block 524 of FIG. 5A may represent either one of these mechanisms or any other mechanism utilized to complete the graph matching functions described herein.

(1) Merging Matches

When the target pattern graph generated is a small to medium size, based on a pre-determined number of nodes and edges as defined by the analyst or the eGMIDS program, eGMIDS utility initiates the merging matches algorithm to search for matches with small to medium size input threat patterns. In one embodiment, the system administrator/analyst pre-selects/pre-programs which algorithm among the multiple available algorithms to implemented when completing the subgraph isomorphism. The pre-selected/pre-programmed information may then be stored in the configuration files in the threat pattern library 358. The merging matches algorithm performs a complete search, so all partial and complete matches at or above a certain match quality threshold are guaranteed to be found. Any other potential matches are below the match quality threshold.

In the illustrative embodiment, merging matches operates by building up a list of partial matches and combining them with other partial matches until complete (or nearly complete) matches are found. The initial partial matches match one node from the input threat pattern to one node in the pattern graph. The algorithm then iteratively merges partial matches with each other until the best matches are found. At each step, any two partial matches that differ by exactly one node are combined if all the nodes they match are connected by an edge in the pattern graph. The resulting partial match is guaranteed to be internally connected and to contain exactly one more node than either of its parents. These new partial matches are then ranked according to their quality of match with the pattern graph. Entries that cannot pass the quality threshold match under even the best circumstances are removed, and the process of merging continues until the entire threat pattern is matched or no new larger matches can be generated. At this point, if any of the partial or complete matches are sufficiently similar to the threat pattern that they pass the match quality threshold, the algorithm records these matches and provides them to the analyst to examine. Whenever a candidate match passes a certain threshold of similarity to the threat pattern, then the candidate match is sent to the analyst for inspection, regardless of whether every detail matches.

Merging Matches executes fairly quickly for medium size pattern graphs. The analyst defines a threshold size (e.g., number of nodes) for a threat graph that is searched utilizing merging matches technique. For pattern graphs whose size is above the threshold size, eGMIDS automatically implements one of several different, less exhaustive methods. The implementation of the other methods occurs because, for large pattern graphs, the list of partial matches grows too rapidly for the merging matches approach to be practical.

(2) Genetic Search

The Merging Matches algorithm within eGMIDS graph matching engine is unable to handle searches involving large threat patterns. Yet analysts may need to search for patterns that contain more than a dozen nodes in activity graphs with thousands or even millions of nodes and edges. In such cases, eGMIDS graph matching engine provides a genetic search algorithm to efficiently search for large threat patterns within an activity graph. In eGMIDS graph matching engine, the initial population is generated by randomly selecting combinations of nodes in the activity graph to create potential matches. These matches are then ranked by a fitness function to determine their closeness to the threat pattern.

Following this initial creation, the successive development of this population is provided through processes modeling reproduction and natural selection. As shown, following the ranking of matches for by the fitness function, the members of the population with the highest scores reproduce with a randomly selected member of the general population. New members are then added to the population by combining aspects of each parent. Other new matches are created through stochastic variation, or mutation, of an individual "parent", in which a node in the match is randomly altered. Finally, the algorithm ranks the new population, consisting of all the previous members plus newly generated children. The population size is maintained constant at this point by culling the lowest ranking members. The process of reproduction is then repeated through successive generations, until the average fitness of the population ceases to increase in a statistically significant manner. At this point, any specimens passing the match quality threshold are selected as the result of the search. While genetic algorithms are not complete and may not find every possible solution within the search space, they have proven effective at efficiently finding solutions to difficult optimization problems within enormous search spaces.

The fitness measure used by eGMIDS graph matching engine calculates the quality of a match based on the weighted edit distance between observed activity match and the threat pattern. To compute the weighted edit distance, a cost is assigned to change, add, or delete each node, edge and attribute in the threat pattern. The total edit cost is defined as the sum of the costs of the edits required to transform the observed activity into an exact match to the threat pattern. The total construction cost is the sum of the costs of the edits required to transform an empty The quality with which observed activity matches the threat pattern is the ratio between the total cost of all nodes, edges and attributes and the cost of those elements that the potential match lacks. Some attributes in the threat pattern may be designated as required, in which case the probability of a match is zero unless these necessary attributes are present.

(3) Distributed Genetic Search

In one embodiment, eGMIDS graph matching engine distributes its genetic search over several processes to increase the speed of the search. eGMIDS graph matching engine assigns a limited search domain to each process, potentially running on different machines. These limited domains require a particular node or nodes in the threat pattern to be bound to a specific node in the activity graph. Each process then performs its own genetic search on the limited domain, and if any of its candidate matches pass the match quality threshold, they are incorporated into the collective search results Once all subordinate processes have reported their results, eGMIDS graph matching engine passes on all acceptable matches to the analyst.

A distributed approach reduces the time required for the search. Several smaller searches are performed by multiple processors, so that the final results are delivered much faster. The efficiency of eGMIDS graph matching engine's search is further enhanced by using a reduced candidate set (described below), which allows the exclusion of many possible matches without an actual search, so that considerably less computation will have to be performed.

(4) Candidate Set Reduction Optimization

When searching for a pattern match within the activity graph, many of the possible combinations can be ignored. The eGMIDS utility recognizes that in general, it is only worthwhile to search for matches that are connected, that is, matches for which there exists at least one path between any two constituent nodes. In one embodiment, the search engine of eGMIDS generates a reduced candidate set at each stage of the search, constructed to preserve this principle of connectedness. When a partial match contains one node, the eGMIDS search engine only needs to consider as possibilities those nodes that are reachable from the matched node within a number of steps less than or equal to the maximum distance between any two nodes in the threat pattern. This optimization greatly improves the efficiency of the search without any meaningful losses in completeness.

(5) Constraints

The eGMIDS utility allows the security analyst to define constraints on a threat pattern that filter out matches that may have the same configuration as a potential threat, but are most likely harmless. Constraints let the analyst place restrictions on the attribute values of one or more nodes or edges in the threat pattern. The analyst defines constraints using a simple constraint language. This is another way in which GMIDS accounts for the relevance of context in threat detection.

For example, a failed login attempt might be harmless if it occurs only once. The same failed attempt should take on a threatening aspect if it occurs thousands of times within a brief timeframe. An analyst could define a constraint on failed login detection that sets a lower bound on how many attempts are required before the failed login is considered a threat. With this example, the above constraint may be written:

[FailedLoginAlert].numberOfAttempts>100

This assumes that FailedLoginAlert is a node in the threat pattern with an integer-valued attribute named numberOfAttempts. These user-defined constraints are then parsed, compiled and integrated into the eGMIDS threat patterns, resulting in the computation of constraints almost as quickly as if the constraints had been hard-coded into GMIDS.

Constraints may be defined such that they restrict a single attribute value (as shown in paragraph 0112). Alternatively, they may be defined to restrict the relationship between two or more attribute values. For example, an analyst could define a constraint between the payload size of a packet and the buffer size of a web server application on a given host. With this example, the above constraint may be written:

[Packet].payloadSize>[Host].webServerBufferSize

This assumes that Packet and Host are nodes in the threat pattern with integer-valued attributes named payloadSize and webServerBufferSize, respectively.

(6) Ontological Generalization

In one embodiment, in order for eGMIDS to fuse data from different sources and combine that data in a meaningful manner, eGMIDS provides a mechanism by which classes or taxonomies of entities and attribute values are recognized. In eGMIDS, this kind of classification is accomplished utilizing an ontology. As utilized herein, an ontology groups items in a hierarchy according to kind. The ontology may be considered a hierarchical structure that allows multiple parents for each object. In this way, an ontology may be visualized as a directed acyclic graph, where nodes represent items in the hierarchy and edges represent generalization.

Figure 6:
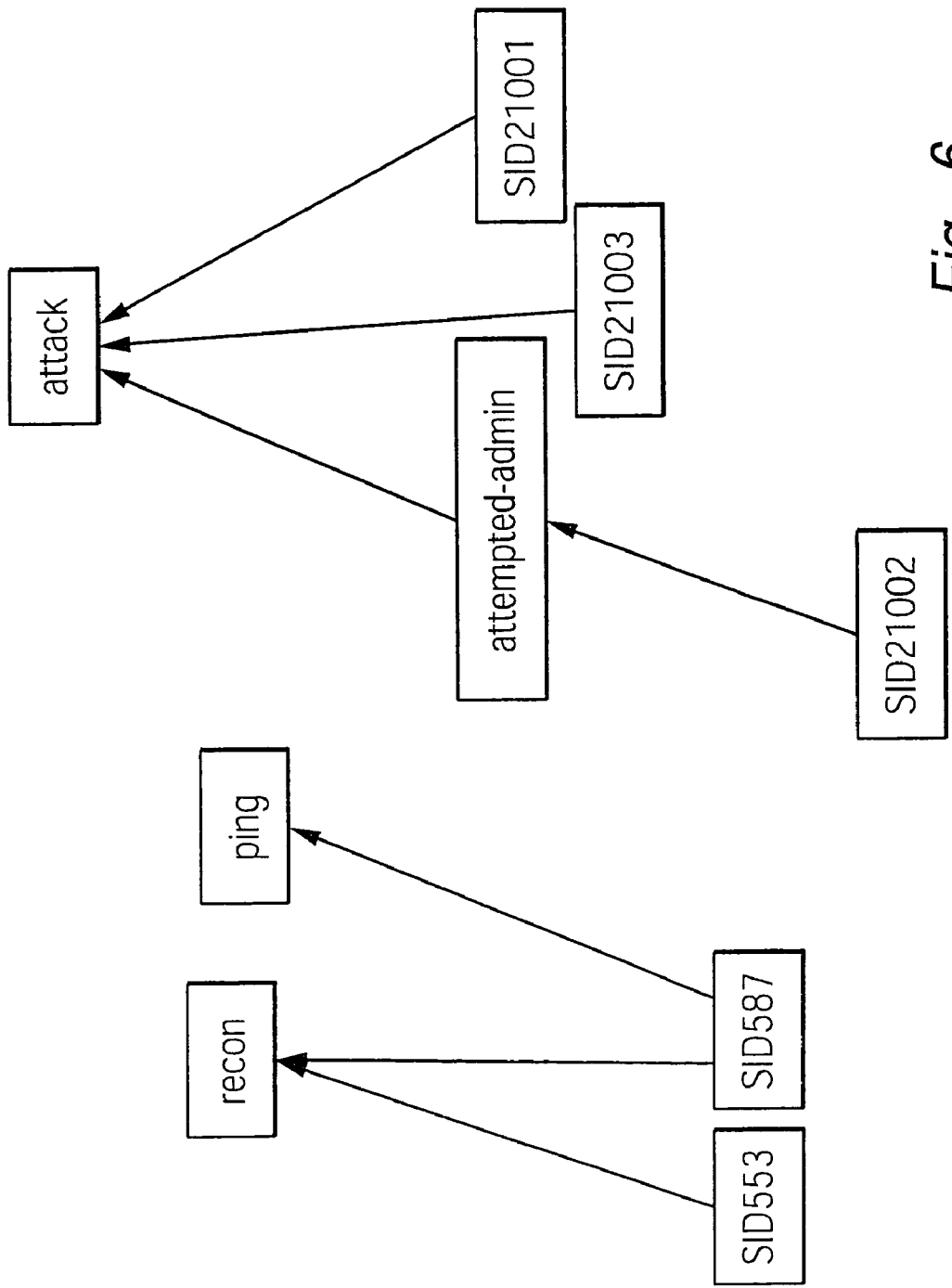
FIG. 6 is an ontological representation of a hierarchy of events/activities according to one embodiment of the invention.

A sample ontology that may be applicable to an eGMIDS is shown in FIG. 6. As shown, each Snort Identification (SID), e.g., SID553, SID587, represents an individual/separate Snort alert 602. Both SIDs are different types of reconnaissance events, and SID587 is in addition a type of ping event. Further, each other event/activity presented (i.e., recon, ping, attempted-admin, attack) represents a category, which may be a generalization of events/activity below it in the hierarchy. For example, the attack category 630 may be a generalization of both specific SIDs 602 and other categories 610, each of which may have sub-categories or other specific SIDs associated with them. Any particular SID or category (e.g., SID587) may have multiple parents in the hierarchy. SID587, for example, is both a recon event (within recon category 620) and a ping event. The above described and illustrated hierarchy is provided solely for illustration and is not meant to imply any limitations on the invention.

Utilizing the "recon" ontology, an analyst is able to define a threat pattern with a node that refers to a recon event. Using this ontology, eGMIDS search engine would match the threat pattern (node) to either SID553 or SID587, but not to SID21002. With this approach, redundant threat patterns do not need to be created to refer to these two alerts specifically, since one threat pattern referring to their common super-class "recon" will suffice. Additionally, this approach reduces in size the number of threat patterns for which a search must be performed.

(7) Inexact Matching

The eGMIDS comprises an inexact matching capability. The merging matches graph matching engine of eGMIDS uses a constructive search, building potential matches node by node until a match is identified. In one embodiment, candidate matches are scored at each level of the construction, according to how well the candidate matches a threat pattern being searched for. This score is based on the presence or absence of nodes and edges along with their attributes and constraints. Within this searching method, certain attributes or constraints may be marked as necessary, where their absence automatically results in a negative match. All other attributes and constraints are given points according to their importance to the threat pattern.

This inexact matching capability gives eGMIDS three unique capabilities. Inexact matching gives eGMIDS the ability to detect new threat variations the first time the variations are seen. Inexact matching also enables tracking of slight to moderate variations in the method of attack as a computer hacker changes the attack strategies and/or techniques. Finally, the inexact matching capability insulates eGMIDS from mistakes in the threat patterns generated by imperfect human analysts.

Whatever their cause, differences between a threat pattern and observed activity can cause problems for systems without eGMIDS' inexact matching capability. These differences may cause threatening activity to escape the notice of conventional rule-based detection systems. As implemented, eGMIDS recognizes that most of these changes are evolutionary, and diverge from previously witnessed attacks only in minor respects. By implementing the inexact matching algorithm, eGMIDS is able to effectively detect variations on previously recorded strategies, giving the analyst a head start on emerging threats. The analyst is then able to refine the threat pattern and enable future searches to reflect whether the partial match is irrelevant or a significant security development.

(8) Hierarchical Threat Patterns eGMIDS comprises a hierarchical pattern representation capability for detecting complex coordinated threats that use other known threat activity as building blocks. The eGMIDS threat patterns may be defined in terms of other eGMIDS threat patterns. For example, a first threat pattern might represent a particular class of reconnaissance event, and a second threat pattern might represent a particular class of attack event. A new eGMIDS threat pattern can be built that requires one or more of these reconnaissance events in close association with a subsequent threat event. This entire set of activity can be represented succinctly as a hierarchical eGMIDS threat pattern. As a result, eGMIDS can easily represent the complex sets of activity that allow detection of insider and coordinated attacks.

G. Retrieval and Utilization of Secondary Evidence

The eGMIDS is particularly powerful because integrating information from various sources gives context to each individual piece of data/information. In one embodiment, eGMIDS extends the search functionality to provide a layered approach, involving a first layer of primary evidence ("primary evidence layer") and a second layer utilizing secondary evidence ("secondary evidence layer"). With this implementation, the secondary evidence is utilized to provide additional contextual information and detail. Threat patterns are defined in both the primary evidence layer and the secondary evidence layer.

eGMIDS first attempts to locate primary evidence that matches the primary threat pattern. Once matching primary evidence has been located, the search is expanded to the secondary evidence layer 710, and matches to the primary evidence are explored to see whether the secondary evidence can be matched to the secondary threat pattern using the same nodes. A threat is only reported if the analysis passes both tests. In general, eGMIDS uses alerts from other IDSes in the primary layer, thus reducing the size of the primary activity graph to be searched. Specific packet information is used as a secondary layer and is only examined when necessary. The addition of secondary evidence functionality greatly improves the search performance both by reducing the size of the primary activity graph and by localizing detailed searches to achieve a greater level of accuracy in threat recognition. Further, because there is generally too much secondary evidence to search through all of the time, secondary evidence searches are only conducted when clues have been found in the primary evidence that suggests to the analyst that there is a potential threat.

Figure 7B:
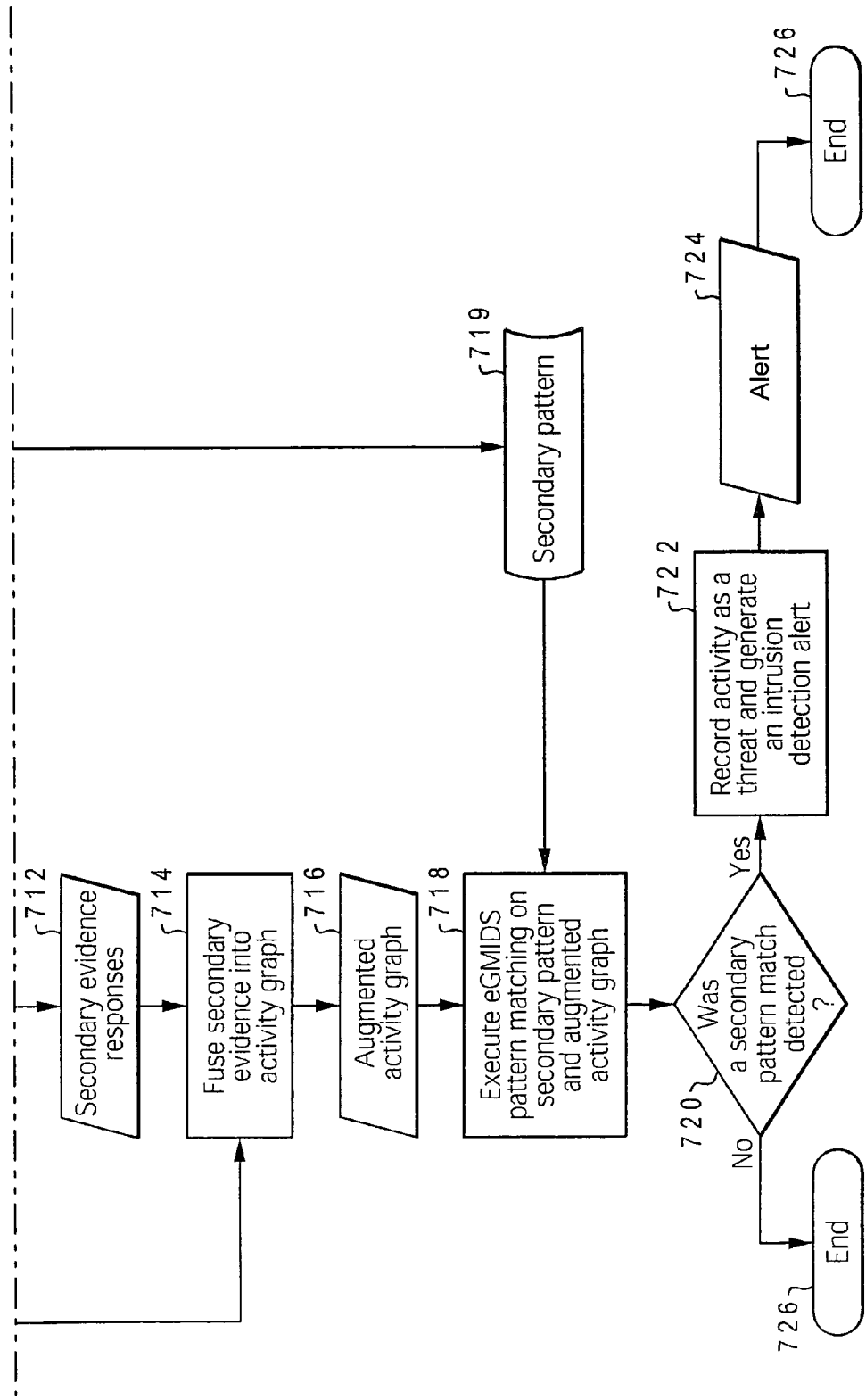
FIGS. 7(A-B) provide a flow chart illustrating the process of completing threat detection via secondary evidence mechanisms according to one embodiment of the invention.

FIG. 7(A-B) illustrates an example flow chart of the threat detection processing utilizing a secondary evidence mechanism/method within eGMIDS. The process begins at block 702, and proceeds to block 704 at which eGMIDS utility executes the eGMIDS pattern matching on the primary threat pattern 703 and fused activity graph 705. The primary threat pattern 703 describes the initial clues to the presence of suspicious activity and is retrieved from eGMIDS pattern library 701. According to the described embodiment, the eGMIDS threat patterns may contain primary threat patterns, secondary evidence request templates, and secondary threat patterns.

The fused activity graph 705 contains only primary sensor evidence. As described above, the primary evidence is provided by sensors without any request. Secondary evidence, in contrast, is provided by sensors only in response to a specific request in the form of an instantiated secondary evidence request template 709. By supplying secondary evidence only when requested and only on a subset of the activity, and by following the tiered pattern matching strategy, eGMIDS sensors allow detailed pattern matching on all relevant evidence while simultaneously controlling runtime and data volumes. Further, performing graph-based search over full (primary and secondary) evidence for all activity is not feasible because the full set of secondary evidence is generally much too large.

Returning now to FIG. 7, following the execution of eGMIDS pattern matching, a determination is made at block 706 whether a match to the primary threat pattern is detected. If no primary threat pattern match is detected, the process ends at termination block 726. When a primary threat pattern match is detected, eGMIDS utility generates and forwards requests for secondary evidence to the eGMIDS sensors, as shown at block 708. The secondary evidence requests are dictated by the threat pattern utilizing secondary evidence request templates 709, which describe parameterizable queries that request eGMIDS sensors to gather additional information on a suspicious set of activity.

The eGMIDS sensors at the respective host servers then produce and package the requested additional evidence at block 710 in the form of secondary evidence responses 712. Following, the secondary evidence is fused into the activity graph, as indicated at block 714, resulting in the augmented activity graph 716. The eGMIDS utility then executes eGMIDS pattern matching on the secondary threat pattern and augmented activity graph evidence, as shown at block 718. A determination is then made at block 720 whether a secondary threat pattern match is detected. If not, then the process ends at termination block 726. If a secondary match is detected, eGMIDS utility records the activity as a threat and generates an intrusion detection alert, as shown at block 722. Notably, with this implementation, only if a set of activity is initially considered suspicious and is backed up by detailed evidence to support those suspicions will the activity be flagged as an alert. The eGMIDS utility issues the intrusion detection alert (per block 724), storing the alert in the activity archive 364 and displaying the alert on the analysis GUI 116. Then the process ends at termination block 726.

As a final matter, it is important that while an illustrative embodiment of the present invention has been, and will continue to be, described in the context of a fully functional computer system with installed management software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. In a network computer environment comprising an intrusion detection system (IDS) server communicatively connected to one or more host devices, a method comprising:

receiving from at least one of the one or more host devices activity data corresponding to the specific host device and operations and activity occurring on the host device and among two or more host devices;

converting the received activity data into a specialized format, which supports data fusion;

generating a graphical representation of the activity within and communication amongst the one or more host devices and the IDS server, said graphical representation being an activity graph comprising a series of interconnected nodes and edges each representing one or more of the host devices and the activities occurring at the host device and communications between host devices;

comparing one or more pre-determined threat patterns against said activity graph, wherein said threat patterns represent activities of interest;

providing an alert when at least one of the one or more pre-determined threat patterns matches up to connected nodes and edges within the activity graph;

generating a pattern library comprising threat patterns representing known activities of interest and newly discovered threat patterns that represent potential threats to the network; and dynamically performing subgraph isomorphism utilizing one or more of the threat patterns within the activity graph to identify suspicious activity within the activity graph, wherein distributed and coordinated attacks perpetrated by attackers are detected.

2. The method of claim 1, further comprising providing an activity archive comprising a list of alerts.

3. The method of claim 1, wherein:

said receiving comprises receiving the activity data in 21Messaging (21m) format;

said converting comprises: un-packaging the activity data from its received format; and translating the received activity data into a format that is usable by a graphical engine that generates the activity graph; and said generating comprises fusing the translated activity data into the activity graph.

4. The method of claim 1, wherein said analyzing comprises:

enabling user selection of a search method from among multiple available search methods including an exhaustive search method and a non-exhaustive search method, wherein a particular search method is selected based on the size of the threat pattern.

5. The method of claim 4, wherein said first exhaustive search method comprises:

matching nodes in the pattern graph to nodes in the activity graph when the connections between the nodes within the activity graph matches the connections between the nodes of the pattern graph;

determining whether a match is found to the threat pattern within the activity graph; and when a match is found, generating and outputting an alert indicating the match was found within the activity graph.

6. The method of claim 1, wherein said comparing further comprises:

enabling an analyst to define constraints on a threat pattern that filters out matches that have similar configuration as a potential threat but are not considered harmful; and receiving one or more constraints and parsing, compiling and integrating said constraints into the runtime environment of the IDS server.

7. The method of claim 1, wherein said comparing further comprises:

providing an ontological generalization hierarchy wherein similar events are generalized and grouped into a single ontological category, wherein the single ontological category is utilized within the search engine to discover any one of multiple attacks that are covered by the ontological generalization;

wherein further the ontological generalization hierarchy supports multiple parents per child event, such at one or more single event is a member of multiple ontological categories; and wherein said ontological generalization hierarchy comprises multiple layers such that one or more category is a generalization of multiple other categories and multiple specific events.

8. The method of claim 1, wherein said comparing further comprises:

establishing a reduced candidate set, whereby only nodes reachable from a potential matching node within a number of steps less than or equal to the pre-established maximum distance between any two nodes in the threat pattern are considered for a match.

9. The method of claim 1, wherein said signaling comprises forwarding an alert to an output mechanism to inform a system analyst of the detected pattern and the threat associated with the detected pattern.

10. The method of claim 1, further comprising:

forwarding the activity data received to an activity archive; and maintaining a plurality of components within the activity archive, including a list of old activity graphs, a list of alerts and graphs represented by the respective alerts, and history of IDS control server performance metrics.

11. The method of claim 1, wherein a search is further defined by a constraint that utilizes attributes of one or more nodes and/or edges to refine the search criteria and improve detection of real threats, while decreasing false alarms, wherein said constraints comprise timing constraints, IP address masking, counts, and restrictions on protocols and wherein a constraint is built to restrict single attribute values or relationships between multiple attribute values.

12. In a network computer environment comprising an intrusion detection system (IDS) server communicatively connected to one or more host devices, a method comprising:

receiving from at least one of the one or more host devices activity data corresponding to the specific host device and operations and activity occurring on the host device and among two or more host devices;

converting the received activity data into a specialized format, which supports data fusion;

generating a graphical representation of the activity within and communication amongst the one or more host devices and the IDS server, said graphical representation being an activity graph comprising a series of interconnected nodes and edges each representing one or more of the host devices and the activities occurring at the host device and communications between host devices;

comparing one or more pre-determined threat patterns against said activity graph, wherein said threat patterns represent activities of interest;

providing an alert when at least one of the one or more pre-determined threat patterns matches up to connected nodes and edges within the activity graph;

enabling inexact matching wherein variations in a sample threat pattern are identified within the activity graph and outputted for analysis;

assigning a score to each node and edges within a pattern, said score based on one of the presence or absence of the node and edge along with the associated attribute values and constraints;

tracking a score as a threat pattern is compared within the activity graph, said score providing an indication of a level of similarity between the pattern and the found components within the activity graph;

comparing the score to a preset threshold value, said threshold value being selected by an analyst to represent a possible mutation of a known threat; and when the score passes the threshold value, automatically forwarding the found "match" to the analyst for review.

13. In a network computer environment comprising an intrusion detection system (IDS) server communicatively connected to one or more host devices, a method comprising:

receiving from at least one of the one or more host devices activity data corresponding to the specific host device and operations and activity occurring on the host device and among two or more host devices;

converting the received activity data into a specialized format, which supports data fusion;

generating a graphical representation of the activity within and communication amongst the one or more host devices and the IDS server, said graphical representation being an activity graph comprising a series of interconnected nodes and edges each representing one or more of the host devices and the activities occurring at the host device and communications between host devices;

comparing one or more pre-determined threat patterns against said activity graph, wherein said threat patterns represent activities of interest;

providing an alert when at least one of the one or more pre-determined threat patterns matches up to connected nodes and edges within the activity graph;

analyzing a fused activity graph for primary evidence of a potential threat;

generating a request for secondary evidence from sensor(s) at specific target device(s) and forwarding the request to the device(s) sensor(s);

on receipt of the secondary evidence from the targeted device(s), fusing said secondary evidence into the fused activity graph;

performing detailed pattern matching on merged data portions within the augmented activity graph, directed at the merged data portion of the fused activity graph, wherein said patterns comprise primary patterns, secondary request templates and secondary patterns; and when the second pattern matching results in a match, triggering an alert via an output mechanism.

14. The method of claim 13, wherein said comparing further comprises:

recording the activity as a threat and generating an intrusion detection alert; and storing the matches to the threat patterns from the first and secondary evidence comparison within the pattern library.

15. A data processing system (DPS) comprising:

a processor and memory connected via a system bus;

a network interface device by which the data processing system connects to an external network and communicates with external network devices;

an intrusion detection system (IDS) utility comprising instruction code that when executed by the processor provides the functions of:

receiving from at least one of the one or more host devices activity data corresponding to the specific host device and operations and activity occurring on the host device and among two or more host devices;

converting the received activity data into a specialized format, which supports data fusion;

generating a graphical representation of the activity within and communication amongst the one or more host devices and the IDS server, said graphical representation being an activity graph comprising a series of interconnected nodes and edges each representing one or more of the host devices and the activities occurring at the host device and communications between host devices;

comparing one or more pre-determined threat patterns against said activity graph, wherein said threat patterns represent activities of interest;

providing an alert when at least one of the one or more pre-determined threat patterns matches up to connected nodes and edges within the activity graph;

generating a pattern library comprising threat patterns representing known activities of interest and newly discovered threat patterns that represent potential threats to the network;

providing an activity archive comprising a list of alerts; and dynamically performing subgraph isomorphism utilizing one or more of the threat patterns within the activity graph to identify suspicious activity within the activity graph, wherein distributed and coordinated attacks perpetrated by attackers are detected.

16. The DPS of claim 15, wherein the IDS utility further comprises code wherein:

said receiving comprises receiving the activity data in 21Messaging (21m) format; said converting comprises un-packaging the activity data from its received format;

translating the received activity data into a format that is usable by a graphical engine that generates the activity graph; and said generating comprises fusing the translated activity data into the activity graph.

17. The DPS of claim 15, wherein said comparing code further comprises code for:

enabling user selection of a search method from among multiple available search methods including an exhaustive search method and a non-exhaustive search method, wherein a particular search method is selected based on the size of the threat pattern.

18. The DPS of claim 15, wherein said comparing code further comprises code for:

enabling an analyst to define constraints on a threat pattern that filters out matches that have similar configuration as a potential threat but are not considered harmful; and receiving one or more constraints and parsing, compiling and integrating said constraints into the runtime environment of the IDS server.

19. The A data processing system (DPS) comprising:

a processor and memory connected via a system bus;

a network interface device by which the data processing system connects to an external network and communicates with external network devices;

an intrusion detection system (IDS) utility comprising instruction code that when executed by the processor provides the functions of:

receiving from at least one of the one or more host devices activity data corresponding to the specific host device and operations and activity occurring on the host device and among two or more host devices;

converting the received activity data into a specialized format, which supports data fusion;

generating a graphical representation of the activity within and communication amongst the one or more host devices and the IDS server, said graphical representation being an activity graph comprising a series of interconnected nodes and edges each representing one or more of the host devices and the activities occurring at the host device and communications between host devices;

comparing one or more pre-determined threat patterns against said activity graph, wherein said threat patterns represent activities of interest;

providing an alert when at least one of the one or more pre-determined threat patterns matches up to connected nodes and edges within the activity graph;

providing an ontological generalization hierarchy wherein similar events are generalized and grouped into a single ontological category, wherein the single ontological category is utilized within the search engine to discover any one of multiple attacks that are covered by the ontological generalization;

wherein further the ontological generalization hierarchy supports multiple parents per child event, such at one or more single event is a member of multiple ontological categories;

wherein said ontological generalization hierarchy comprises multiple layers such that one or more category is a generalization of multiple other categories and multiple specific events;

establishing a reduced candidate set, whereby only nodes reachable from a potential matching node within a number of steps less than or equal to the pre-established maximum distance between any two nodes in the threat pattern are considered for a match;

enabling inexact matching wherein variations in a sample threat pattern are identified within the activity graph and outputted for analysis;

assigning a score to each node and edges within a pattern, said score based on one of the presence or absence of the node and edge along with the associated attribute values and constraints;

tracking a score as a threat pattern is compared within the activity graph, said score providing an indication of a level of similarity between the pattern and the found components within the activity graph;

comparing the score to a preset threshold value, said threshold value being selected by an analyst to represent a possible mutation of a known threat; and when the score passes the threshold value, automatically forwarding the found "match" to the analyst for review.

20. A data processing system (DPS) comprising:
a processor and memory connected via a system bus;
a network interface device by which the data processing system connects to an external network and communicates with external network devices;
an intrusion detection system (IDS) utility comprising instruction code that when executed by the processor provides the functions of:
receiving from at least one of the one or more host devices activity data corresponding to the specific host device and operations and activity occurring on the host device and among two or more host devices;
converting the received activity data into a specialized format, which supports data fusion;
generating a graphical representation of the activity within and communication amongst the one or more host devices and the IDS server, said graphical representation being an activity graph comprising a series of interconnected nodes and edges each representing one or more of the host devices and the activities occurring at the host device and communications between host devices;
comparing one or more pre-determined threat patterns against said activity graph, wherein said threat patterns represent activities of interest;
providing an alert when at least one of the one or more pre-determined threat patterns matches up to connected nodes and edges within the activity graph;
analyzing a fused activity graph for primary evidence of a potential threat;

generating a request for secondary evidence from sensor(s) at specific target device(s) and forwarding the request to the device(s) sensor(s);
on receipt of the secondary evidence from the targeted device(s), fusing said secondary evidence into the fused activity graph;
performing detailed pattern matching on merged data portions within the augmented activity graph, directed at the merged data portion of the fused activity graph, wherein said patterns comprise primary patterns, secondary request templates and secondary patterns;
when the second pattern matching results in a match, triggering an alert via an output mechanism; and
storing the matches to the threat patterns from the first and secondary evidence comparison within the pattern library.

21. The DPS of claim 15, wherein said IDS utility further comprises code for:
forwarding the activity data received to an activity archive; and
maintaining a plurality of components within the activity archive, including a list of old activity graphs, a list of alerts and graphs represented by the respective alerts, and history of IDS control server performance metrics.

22. A computer program product comprising:
a computer readable medium; and
program code on the computer readable medium that when executed by a processor performs the functions of:
receiving from at least one of the one or more host devices activity data corresponding to the specific host device and operations and activity occurring on the host device and among two or more host devices;
converting the received activity data into a specialized format, which supports data fusion;
generating a graphical representation of the activity within and communication amongst the one or more host devices and the IDS server, said graphical representation being an activity graph comprising a series of interconnected nodes and edges each representing one or more of the host devices and the activities occurring at the host device and communications between host devices;
comparing one or more pre-determined threat patterns against said activity graph, wherein said threat patterns represent activities of interest;
providing an alert when at least one of the one or more pre-determined threat patterns matches up to connected nodes and edges within the activity graph;
generating a pattern library comprising threat patterns representing known activities of interest and newly discovered threat patterns that represent potential threats to the network;
enabling user selection of a search method from among multiple available search methods including an exhaustive search method and a non-exhaustive search method, wherein a particular search method is selected based on the size of the threat pattern; and
dynamically performing subgraph isomorphism utilizing one or more of the threat patterns within the activity graph to identify suspicious activity within the activity graph, wherein distributed and coordinated attacks perpetrated by attackers are detected; and wherein:
said receiving comprises receiving the activity data in 21Messaging (21m) format;
said converting comprises un-packaging the activity data from its received format; and translating the received activity data into a format that is usable by a graphical engine that generates the activity graph;

said generating comprises fusing the translated activity data into the activity graph.

23. The computer program product of claim 22, wherein said code for performing said first exhaustive search method comprises code for:

matching nodes in the pattern graph to nodes in the activity graph when the connections between the nodes within the activity graph matches the connections between the nodes of the pattern graph;

determining whether a match is found to the threat pattern within the activity graph; and when a match is found, generating and outputting an alert indicating the match was found within the activity graph.

24. The computer program product of claim 22, further comprising code for:

forwarding the activity data received to an activity archive; and maintaining a plurality of components within the activity archive, including a list of old activity graphs, a list of alerts and graphs represented by the respective alerts, and history of IDS control server performance metrics.

25. A computer program product comprising:

a computer readable medium; and program code on the computer readable medium that when executed by a processor performs the functions of:

receiving from at least one of the one or more host devices activity data corresponding to the specific host device and operations and activity occurring on the host device and among two or more host devices;

converting the received activity data into a specialized format, which supports data fusion;

generating a graphical representation of the activity within and communication amongst the one or more host devices and the IDS server, said graphical representation being an activity graph comprising a series of interconnected nodes and edges each representing one or more of the host devices and the activities occurring at the host device and communications between host devices;

comparing one or more pre-determined threat patterns against said activity graph, wherein said threat patterns represent activities of interest;

providing an alert when at least one of the one or more pre-determined threat patterns matches up to connected nodes and edges within the activity graph;

enabling an analyst to define constraints on a threat pattern that filters out matches that have similar configuration as a potential threat but are not considered harmful; and receiving one or more constraints and parsing, compiling and integrating said constraints into the runtime environment of the IDS server;

providing an ontological generalization hierarchy wherein similar events are generalized and grouped into a single ontological category, wherein the single ontological category is utilized within the search engine to discover any one of multiple attacks that are covered by the ontological generalization;

wherein further the ontological generalization hierarchy supports multiple parents per child event, such at one or more single event is a member of multiple ontological categories;

wherein said ontological generalization hierarchy comprises multiple layers such that one or more category is a generalization of multiple other categories and multiple specific events;

establishing a reduced candidate set, whereby only nodes reachable from a potential matching node within a number of steps less than or equal to the pre-established maximum distance between any two nodes in the threat pattern are considered for a match;

enabling inexact matching wherein variations in a sample threat pattern are identified within the activity graph and outputted for analysis;

assigning a score to each node and edges within a pattern, said score based on one of the presence or absence of the node and edge along with the associated attribute values and constraints;

tracking a score as a threat pattern is compared within the activity graph, said score providing an indication of a level of similarity between the pattern and the found components within the activity graph;

comparing the score to a preset threshold value, said threshold value being selected by an analyst to represent a possible mutation of a known threat; and when the score passes the threshold value, automatically forwarding the found "match" to the analyst for review.

26. A computer program product comprising:

a computer readable medium; and program code on the computer readable medium that when executed by a processor performs the functions of:

receiving from at least one of the one or more host devices activity data corresponding to the specific host device and operations and activity occurring on the host device and among two or more host devices;

converting the received activity data into a specialized format, which supports data fusion;

generating a graphical representation of the activity within and communication amongst the one or more host devices and the IDS server, said graphical representation being an activity graph comprising a series of interconnected nodes and edges each representing one or more of the host devices and the activities occurring at the host device and communications between host devices;

comparing one or more pre-determined threat patterns against said activity graph, wherein said threat patterns represent activities of interest;

providing an alert when at least one of the one or more pre-determined threat patterns matches up to connected nodes and edges within the activity graph;

analyzing a fused activity graph for primary evidence of a potential threat;

generating a request for secondary evidence from sensor(s) at specific target device(s) and forwarding the request to the device(s) sensor(s);

on receipt of the secondary evidence from the targeted device(s), fusing said secondary evidence into the fused activity graph; and performing detailed pattern matching on merged data portions within the augmented activity graph, directed at the merged data portion of the fused activity graph, wherein said patterns comprise primary patterns, secondary request templates and secondary patterns;

when the second pattern matching results in a match, triggering an alert via an output mechanism; and storing the matches to the threat patterns from the first and secondary evidence comparison within the pattern library.

* * * * *